United States Patent
Yook et al.

(10) Patent No.: US 12,163,068 B2
(45) Date of Patent: Dec. 10, 2024

(54) SILICONE HYBRID PRESSURE SENSITIVE ADHESIVE AND METHODS FOR ITS PREPARATION AND USE ON UNEVEN SURFACES

(71) Applicant: Dow Silicones Corporation, Midland, MI (US)

(72) Inventors: Juyoung Yook, Chungcheongbuk-do (KR); Hojin Choi, Chungcheongbuk-do (KR); Deokgu Kim, Chungcheongbuk-do (KR); Nanguo Liu, Midland, MI (US); Zachary Wenzlick, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 20 days.

(21) Appl. No.: 17/910,036

(22) PCT Filed: Mar. 2, 2021

(86) PCT No.: PCT/US2021/020365
§ 371 (c)(1),
(2) Date: Sep. 8, 2022

(87) PCT Pub. No.: WO2021/225675
PCT Pub. Date: Nov. 11, 2021

(65) Prior Publication Data
US 2024/0141210 A1    May 2, 2024

Related U.S. Application Data

(60) Provisional application No. 63/021,178, filed on May 7, 2020.

(51) Int. Cl.
| | | |
|---|---|---|
| C09J 183/06 | (2006.01) | |
| C09J 5/06 | (2006.01) | |
| C09J 7/38 | (2018.01) | |
| C09J 11/06 | (2006.01) | |
| C08G 77/12 | (2006.01) | |
| C08G 77/20 | (2006.01) | |

(52) U.S. Cl.
CPC .  *C09J 7/38* (2018.01); *C09J 5/06* (2013.01); *C09J 11/06* (2013.01); *C09J 183/06* (2013.01); *C08G 77/12* (2013.01); *C08G 77/20* (2013.01); *C09J 2301/302* (2020.08); *C09J 2301/408* (2020.08); *C09J 2301/416* (2020.08); *C09J 2301/50* (2020.08)

(58) Field of Classification Search
CPC ............................ C09J 183/04; C09J 183/06
See application file for complete search history.

(56) References Cited

U.S. PATENT DOCUMENTS

| | | |
|---|---|---|
| 2,676,182 A | 4/1954 | Daudt et al. |
| 3,159,601 A | 12/1964 | Ashby et al. |
| 3,220,972 A | 11/1965 | Lamoreaux et al. |
| 3,296,291 A | 1/1967 | Scotia et al. |
| 3,419,593 A | 12/1968 | Willing et al. |
| 3,516,946 A | 6/1970 | Scotia et al. |
| 3,814,730 A | 6/1974 | Karstedt et al. |
| 3,878,263 A | 4/1975 | Martin |
| 3,989,668 A | 11/1976 | Lee et al. |
| 4,250,053 A | 2/1981 | Smith |
| 4,286,047 A | 8/1981 | Bennett et al. |
| 4,503,208 A | 3/1985 | Lin et al. |
| 4,584,355 A | 4/1986 | Blizzard et al. |
| 4,585,669 A | 4/1986 | Eckberg |
| 4,585,836 A | 4/1986 | Homan et al. |
| 4,587,137 A | 5/1986 | Eckberg |
| 4,591,622 A | 5/1986 | Blizzard et al. |
| 4,611,042 A | 9/1986 | Rivers-Farrell et al. |
| 4,766,176 A | 8/1988 | Lee et al. |
| 4,774,310 A | 9/1988 | Butler |
| 4,784,879 A | 11/1988 | Lee et al. |
| 4,968,559 A | 11/1990 | Kuroda et al. |

(Continued)

FOREIGN PATENT DOCUMENTS

| | | |
|---|---|---|
| CA | 2336195 A1 | 12/1999 |
| EP | 0347895 B | 11/1993 |

(Continued)

OTHER PUBLICATIONS

"Macromolecular Materials and Engineering" by Hung-Wen et al., vol. 292, Issue 5, p. 666-673 (2007).

(Continued)

*Primary Examiner* — Marc S Zimmer
(74) *Attorney, Agent, or Firm* — Catherine U. Brown

(57) ABSTRACT

A silicone hybrid pressure sensitive adhesive composition that cures to form a silicone hybrid pressure sensitive adhesive contains a polydiorganosiloxane having reactive groups. The reactive groups include a silicon bonded (meth) acryloxyalkyl-functional group in a pendant position and a silicon bonded aliphatically unsaturated hydrocarbon group. An adhesive article, such as a tape, can be formed by coating the silicone hybrid pressure sensitive adhesive composition on a surface of a substrate and curing said composition via hydrosilylation reaction (B-staged cure) to form a silicone hybrid pressure sensitive adhesive layer on the surface. The silicone hybrid pressure sensitive adhesive layer contains (meth)acryloxyalkyl-functional groups, which can further react and crosslink via exposure to UV radiation (C-staged cure).

15 Claims, No Drawings

(56) References Cited

U.S. PATENT DOCUMENTS

| | | | |
|---|---|---|---|
| 5,010,159 A | 4/1991 | Bank et al. | |
| 5,017,654 A | 5/1991 | Togashi et al. | |
| 5,036,117 A | 7/1991 | Chung et al. | |
| 5,118,567 A | 6/1992 | Komiyama et al. | |
| 5,175,325 A | 12/1992 | Brown et al. | |
| 5,217,805 A | 6/1993 | Kessel et al. | |
| 5,281,473 A | 1/1994 | Ishiwata et al. | |
| 5,457,220 A | 10/1995 | Razzano | |
| 5,516,858 A | 5/1996 | Morita et al. | |
| 5,982,041 A * | 11/1999 | Mitani | C09J 183/04 428/447 |
| 6,000,603 A | 12/1999 | Koskenmaki et al. | |
| 6,039,831 A * | 3/2000 | Mine | C08L 83/06 524/588 |
| 6,239,246 B1 | 5/2001 | Takahashi et al. | |
| 6,281,285 B1 | 8/2001 | Becker et al. | |
| 6,387,487 B1 * | 5/2002 | Greenberg | C09J 183/04 428/355 R |
| 6,677,740 B1 | 1/2004 | Chen et al. | |
| 6,906,425 B2 | 6/2005 | Stewart et al. | |
| 7,659,003 B2 | 2/2010 | Aoki et al. | |
| 8,076,411 B2 | 12/2011 | Maton et al. | |
| 8,377,634 B2 | 2/2013 | Albaugh et al. | |
| 8,436,122 B2 | 5/2013 | Kho et al. | |
| 8,580,862 B2 | 11/2013 | Barnes et al. | |
| 8,618,234 B2 | 12/2013 | Mizuno et al. | |
| 8,920,592 B2 | 12/2014 | Suwa et al. | |
| 9,023,433 B2 | 5/2015 | Fu et al. | |
| 9,051,428 B2 | 6/2015 | Davio et al. | |
| 9,475,968 B2 | 10/2016 | Hammond et al. | |
| 9,593,209 B2 | 3/2017 | Dent et al. | |
| 9,751,988 B2 | 9/2017 | Jo et al. | |
| 9,853,193 B2 | 12/2017 | Amako et al. | |
| 10,167,418 B2 | 1/2019 | Yamazaki et al. | |
| 10,208,164 B2 | 2/2019 | Dogen et al. | |
| 2002/0071958 A1 | 6/2002 | Mertz et al. | |
| 2004/0116547 A1 | 6/2004 | Bennington | |
| 2011/0111217 A1 | 5/2011 | Kuroda et al. | |
| 2011/0224593 A1 | 9/2011 | Tunius | |
| 2015/0147510 A1 | 5/2015 | Saito | |
| 2018/0305547 A1 | 10/2018 | Dogen et al. | |
| 2019/0148598 A1 | 5/2019 | Bower et al. | |
| 2023/0091861 A1 * | 3/2023 | Yook | C09J 183/06 524/588 |
| 2023/0227700 A1 * | 7/2023 | Yook | C09J 183/06 156/275.7 |

FOREIGN PATENT DOCUMENTS

| | | |
|---|---|---|
| JP | H0853156 A | 2/1996 |
| JP | 3043988 B2 | 5/2000 |
| JP | 2000252342 A | 9/2000 |
| JP | 200327017 A | 1/2003 |
| JP | 2007254661 A | 10/2007 |
| KR | 101301941 B1 | 8/2013 |
| WO | 1997006836 A2 | 2/1997 |
| WO | 2000061692 A1 | 10/2000 |
| WO | 2014200112 A1 | 12/2014 |
| WO | 2015126780 A1 | 8/2015 |
| WO | 2015182816 A1 | 12/2015 |
| WO | 2015187909 A1 | 12/2015 |
| WO | 2015194654 A1 | 12/2015 |
| WO | 2016175365 A1 | 11/2016 |
| WO | 2017068762 A1 | 4/2017 |
| WO | 2017182638 A1 | 10/2017 |
| WO | 2018169280 A1 | 9/2018 |
| WO | WO-2019070866 A1 * | 4/2019 |
| WO | 2020186127 A1 | 9/2020 |

OTHER PUBLICATIONS

ASTM Standard E-168-16.

Husar, "The formulator's guide to anti-oxygen inhibition additives." Progress in Organic Coatings, 2014, pp. 1789-1798.

Noll, "Chemistry and Technology of Silicone", Academic Press, 1968, chapter 5, pp. 190-245.

* cited by examiner

SILICONE HYBRID PRESSURE SENSITIVE ADHESIVE AND METHODS FOR ITS PREPARATION AND USE ON UNEVEN SURFACES

CROSS REFERENCE TO RELATED APPLICATIONS

This application is a U.S. national stage filing under 35 U.S.C. § 371 of PCT Application No. PCT/US21/020365 filed on 2 Mar. 2021, currently pending. which claims the benefit of U.S. Provisional Patent Application No. 63/021,178 filed 7 May 2020 under 35 U.S.C. § 119 (e). PCT Application No. PCT/US21/020365 and U.S. Provisional Patent Application No. 63/021,178 are each hereby incorporated by reference.

TECHNICAL FIELD

This invention relates to a silicone hybrid pressure sensitive adhesive composition that cures to form a silicone hybrid pressure sensitive adhesive. The silicone hybrid pressure sensitive adhesive can adhere to uneven surfaces.

BACKGROUND

Covering substrates with uneven surfaces (e.g., substrates common in electronic device fabrication, having features on their surfaces) may be difficult using conventional silicone pressure sensitive adhesives (PSAs) due to the elastic property (recovery force against pressure) of the conventional PSA, regardless of its adhesion strength. However, lowering the crosslink density to produce a PSA having non-elastic property (very low crosslinking) to cover such uneven surfaces, may result in the PSA having poor physical stability (e.g., the PSA could flow or deform under conditions in which the electronic device is fabricated or used). A PSA with very low crosslinking may also suffer from the drawback of not being reworkable because cohesive failure can easily occur, or the drawback of not holding tightly of substrates for long-term protection of surface of electronic device. Therefore, there is an industry need for pressure sensitive adhesives that can adhere and conform to uneven surfaces but still have sufficient crosslink density to overcome those drawbacks.

BRIEF SUMMARY OF THE INVENTION

A silicone hybrid pressure sensitive adhesive composition and method for its preparation are provided. The silicone hybrid pressure sensitive adhesive composition comprises: (A) a linear, or substantially linear, polydiorganosiloxane having reactive groups comprising a silicon bonded (meth)acryloxyalkyl-functional group in a pendant position and a silicon bonded aliphatically unsaturated hydrocarbon group; (B) a polyorganosilicate resin; (C) a polyorganohydrogensiloxane; (D) a hydrosilylation reaction catalyst; (E) a photoradical initiator; (F) a hydrosilylation reaction inhibitor; and (G) a free radical scavenger. The silicone hybrid pressure sensitive adhesive composition may optionally further comprise one or more of (H) a solvent, (I) an additive selected from the group consisting of a sensitizer and a synergist, and (J) a filler.

DETAILED DESCRIPTION OF THE INVENTION

The silicone hybrid pressure sensitive adhesive composition comprises:

100 parts by weight of (A) a linear, or substantially linear, polydiorganosiloxane having reactive groups comprising a silicon bonded (meth)acryloxyalkyl-functional group in a pendant position and optionally a silicon bonded aliphatically unsaturated hydrocarbon group in a terminal position, wherein starting material (A) comprises unit formula $M_p M''_q D_m D'_n D''_o T'''_r Q_S$, where M represents a unit of formula $(R^1_3 SiO_{1/2})$, M'' represents a unit of formula $(R^1_2 R^3 SiO_{1/2})$, D represents a unit of formula $(R^1_2 SiO_{2/2})$, D' represents a unit of formula $(R^1 R^2 SiO_{2/2})$, D'' represents a unit of formula $(R^1 R^3 SiO_{2/2})$, T''' represents a unit of formula $(R^5 SiO_{3/2})$, and Q represents a unit of formula $(SiO_{4/2})$, where each $R^1$ is a monovalent hydrocarbon group free of aliphatic unsaturation, each $R^2$ is the (meth)acryloxyalkyl functional group, each $R^3$ is the aliphatically unsaturated monovalent hydrocarbon group, each $R^5$ is independently selected from the group consisting of $R^1$, $R^2$, and $R^3$; and subscripts p, q, m, n, o, r, and s have values such that $0 \leq p$, $0 \leq q$, $o \geq 0$, a quantity $(p+q) \geq 2$, a quantity $(q+o) \geq 2$, $0 < m \leq 10,000$, $2 < n \leq 10,000$, a quantity $(m+n+o)$ is 100 to 10,000, a ratio $(m+o)/n$ is $1/1$ to $500/1$, a ratio $(q+o)/(m+n)$ is 0 to $1/5$, $0 \leq r \leq 100$, and $0 \leq s \leq 100$; a ratio $(m+n+o)/(r+s)$ is $50/1$ to $10,000/1$ if $0 < r$ or if $0 < s$. The polydiorganosiloxane may optionally further comprise small amounts of units of formula $M^{OH}$, where $M^{OH}$ has formula $[R^1_2(HO)SiO_{1/2}]$, where $R^1$ is described above. Without wishing to be bound by theory, it is thought that a small amount of terminal $M^{OH}$ residuals as impurity may be present in starting material (A), although $M^{OH}$ incorporation is not intended during synthesis, and the hydroxyl group is not expected to significantly impact on this application.

(B) a polyorganosilicate resin in an amount sufficient to provide a weight ratio of the polyorganosilicate resin to (A) the polydiorganosiloxane (Resin/Polymer Ratio) of $0.15/1$ to $4/1$, where the polyorganosilicate resin comprises average unit formula $M_a M''_b M'''_c D_d D'_e T'''_f Q_h X_i$, where M, M'', D, D', T''', and Q are as described above, M''' represents a unit of formula $(R^1_2 R^2 SiO_{1/2})$, where $R^1$ and $R^2$ are as described above, X represents hydroxy group and/or alkoxy group, and subscripts a, b, c, d, e, f, h, and i, have values such that $a \geq 0$, $b \geq 0$, $c \geq 0$, and a quantity $(a+b+c) > 10$ mole %; $d \geq 0$, $e \geq 0$, and a quantity $(d+e)$ is 0 to a number sufficient to provide 30 mole % of D units and D' units combined to the resin; $f \geq 0$, with the proviso that subscript f has a maximum value sufficient to provide 40 mole % of T''' units to the resin; $h > 0$, with the proviso that subscript h has a value sufficient to provide 30 mole % to 70 mole % of Q units to the resin; a quantity $(a+b+c+d+e+f+h) = 100$ mole %; $i \geq 0$ is not included in the molar ratio, with the proviso that subscript i has a maximum value sufficient to provide 5 mole % of OX groups to the resin;

(C) a polyorganohydrogensiloxane comprising unit formula $M_t M^H_u D_v D^H_w T_x T^H_y Q_z$, where M, D, T, and Q represent units of the formulas shown above, and $M^H$ represents a unit of formula $(HR^1_2 SiO_{1/2})$, $D^H$ represents a unit of formula $(HR^1 SiO_{2/2})$, $T^H$ represents a unit of formula $(HSiO_{3/2})$, and subscripts t, u, v, w, x, y, and z have values such that $t \geq 0$, $u \geq 0$, $v \geq 0$, $w \geq 0$, $x \geq 0$, $y \geq 0$, $z \geq 0$, a quantity $(u+w+y) \geq 2$, and a quantity $(t+u+v+w+x+y+z)$ is sufficient to give the polyorganohydrogensiloxane a viscosity of 3 mPa·s to 1,000 mPa·s at 25° C.;

with the provisos that starting materials (A), (B), and (C), and amounts of each, are sufficient to provide:
i) a molar ratio of silicon bonded hydrogen atoms in starting material (C) to aliphatically unsaturated monovalent hydrocarbon groups $R^3$ in starting materials (A) and/or (B) (SiH/Vi ratio) of >0.2/1,
ii) a molar ratio of silicon bonded hydrogen atoms in starting material (C) to reactive groups in starting materials (A) and/or (B) (SiH/reactive group ratio) of <0.34, where the reactive groups are $R^2$ and $R^3$ combined;

(D) a hydrosilylation reaction catalyst in an amount sufficient to provide 2 ppm to 500 ppm of platinum based on combined weights of starting materials (A), (B), and (C);
0.1 weight % to 10 weight %, based on combined weights of starting materials (A), (B), and (C), of (E) a photoradical initiator;
10 ppm to 5,000 ppm, based on combined weights of starting materials (A), (B), and (C), of (F) a hydrosilylation reaction inhibitor;
5 ppm to 2,000 ppm, based on combined weights of starting materials (A) and (B), of (G) a free radical scavenger;
0 to 90 weight %, based on combined amounts of all starting materials in the composition, of (H) a solvent;
0 to 5 weight % based on combined weights of starting materials (A) and (B), of (I) an additive selected from the group consisting of a sensitizer and a synergist; and
0 to 30 weight %, based on combined weights of all starting materials in the composition, of (J) a filler.

Methods for preparation and use of the silicone hybrid pressure sensitive adhesive composition are also disclosed.

(A) Polydiorganosiloxane Having Reactive Groups

The silicone hybrid pressure sensitive adhesive composition comprises 100 parts by weight of starting material (A) a linear, or substantially linear, polydiorganosiloxane having reactive groups comprising a silicon bonded (meth)acryloxyalkyl-functional group in a pendant position and a silicon bonded aliphatically unsaturated hydrocarbon group. Starting material (A) comprises unit formula $M_p M''_q D_m D'_n D''_o T'''_r Q_s$, where M represents a unit of formula $(R^1_3 SiO_{1/2})$, M" represents a unit of formula $(R^1_2 R^3 SiO_{1/2})$, D represents a unit of formula $(R^1_2 SiO_{2/2})$, D' represents a unit of formula $(R^1 R^2 SiO_{2/2})$, D" represents a unit of formula $(R^1 R^3 SiO_{2/2})$, T'" represents a unit of formula $(R^5 SiO_{3/2})$, and Q represents a unit of formula $(SiO_{4/2})$. In these units, each $R^1$ is a monovalent hydrocarbon group free of aliphatic unsaturation, each $R^2$ is the (meth)acryloxyalkyl functional group, each $R^3$ is the aliphatically unsaturated monovalent hydrocarbon group, each $R^5$ is independently selected from the group consisting of $R^1$, $R^2$, and $R^3$; and subscripts p, q, m, n, o, r, and s have values such that 0≤p, 0≤q, 0≤o, a quantity (p+q)≥2, a quantity (q+o)≥2, 0<m<10,000, 2<n≤10,000, a quantity (m+n+o) is 100 to 10,000, a ratio (m+o)/n is 1/1 to 500/1, a ratio (q+o)/(m+n) is 0≤to 1/5, 0≤r≤100, and 0≤s≤100, a ratio (m+n+o)/(r+s) is 50/1 to 10,000/1 if 0<r or if 0<s. Alternatively, subscript o may have a value such that 0<o<10,000. Alternatively, the quantity (m+n+o) may be 200 to 9,900. Alternatively, the quantity (m+n+o) may be 300 to 7,000. Alternatively, the ratio (m+o)/n may be 10/1 to 400/1. Alternatively, the ratio (m+o)/n may be 20/1 to 300/1. Alternatively, the ratio (q+o)/(m+n) may be 1/50<to 1/10. Alternatively, subscript r may have a value such that 0≤r≤50. Alternatively, subscript s may have a value such that 0≤s≤50. Alternatively, the ratio (m+n+o))/(r+s) may be 100/1≤to 5,000/1. Alternatively, each $R^5$ may be $R^1$, as described above.

The quantity (q+o) may provide an aliphatically unsaturated monovalent hydrocarbon group, $R^3$, content to the silicone hybrid pressure sensitive adhesive composition sufficient to provide a molar ratio of silicon bonded hydrogen atoms in starting material (C) to aliphatically unsaturated monovalent hydrocarbon groups $R^3$ in starting material (A) of >0.2/1, (alternatively 0.23/1 to 22.0/1, alternatively 0.23/1 to <13/1, alternatively 0.23/1 to <1/1) when starting material (B) does not contain an aliphatically unsaturated monovalent hydrocarbon group, $R^3$.

Suitable monovalent hydrocarbon groups (which are free of aliphatic unsaturation) for $R^1$ in the unit formula above include alkyl groups and aryl groups. The alkyl group may be branched, unbranched, or cyclic. Examples of alkyl groups include methyl, ethyl, propyl (including n-propyl and/or iso-propyl), butyl (including iso-butyl, n-butyl, tert-butyl, and/or sec-butyl), pentyl (including, iso-pentyl, neo-pentyl, and/or tert-pentyl); and hexyl, heptyl, octyl, nonyl, and decyl, as well as branched saturated monovalent hydrocarbon groups of 6 or more carbon atoms; and cyclic alkyl groups such as cyclopentyl or cyclohexyl. Alkyl groups have at least one carbon atom. Alternatively, alkyl groups may have 1 to 12 carbon atoms, alternatively 1 to 10 carbon atoms, alternatively 1 to 6 carbon atoms, alternatively 1 to 4 carbon atoms, alternatively 1 to 2 carbon atoms, and alternatively 1 carbon atom. The aryl group includes, alternatively is, a hydrocarbon group derived from an arene by removal of a hydrogen atom from a ring carbon atom. Aryl is exemplified by, but not limited to, phenyl, naphthyl, benzyl, tolyl, xylyl, phenylethyl, phenyl propyl, and phenyl butyl. Aryl groups have at least 5 carbon atoms. Monocyclic aryl groups may have 5 to 12 carbon atoms, alternatively 6 to 9 carbon atoms, and alternatively 6 carbon atoms. Polycyclic aryl groups may have 9 to 17 carbon atoms, alternatively 9 to 14 carbon atoms, and alternatively 9 to 12 carbon atoms. Alternatively, for $R^1$, the alkyl group may be methyl, and the aryl group may be phenyl. Alternatively, each $R^1$ may be an alkyl group, as described above. Starting material (A) may contain 70 mol % or greater, alternatively 80 mol % or greater, of $R^1$ based on combined amounts of $R^1$, $R^2$, and $R^3$; and each $R^1$ may be methyl. Without wishing to be bound by theory, it is thought that methyl groups are non-reactive and likely to afford wettability on the surface of an adherend as well as stability (e.g., no or minimal thermal shrinkage, degradation, and/or discoloration) after thermal treatment of the silicone hybrid pressure sensitive adhesive (e.g., after exposure to temperatures up to 200° C. during (opto)electronic device fabrication processes).

Suitable (meth)acryloxyalkyl functional groups for $R^2$ in the unit formulas herein are each independently selected from the group consisting of acryloxypropyl and methacryloxypropyl. $R^2$ may be present in a mole % of 0.1% to 25% based on combined amounts of $R^1$, $R^2$, and $R^3$. Alternatively, $R^2$ may be present in a mole % of 0.8% to 12%. Alternatively, $R^2$ may be present in a mole % of 1.5% to 6%.

Suitable aliphatically unsaturated monovalent hydrocarbon groups for $R^3$ include alkenyl and alkynyl groups. The alkenyl group has a double bond and may be branched or unbranched. Alkenyl groups have at least 2 carbon atoms. Alternatively, alkenyl groups may have 2 to 12 carbon atoms, alternatively 2 to 10 carbon atoms, alternatively 2 to 6 carbon atoms, alternatively 2 to 4 carbon atoms, and alternatively 2 carbon atoms. Suitable alkenyl groups include, but are not limited to vinyl, allyl, and hexenyl;

alternatively vinyl and hexenyl. The alkynyl group has a triple bond and may be branched or unbranched. Alkynyl groups have at least 2 carbon atoms. Alternatively, alkynyl groups may have 2 to 12 carbon atoms, alternatively 2 to 10 carbon atoms, alternatively 2 to 6 carbon atoms, alternatively 2 to 4 carbon atoms, and alternatively 2 carbon atoms. Alkynyl groups include ethynyl and propynyl. Alternatively, each aliphatically unsaturated monovalent hydrocarbon group for $R^3$ is an independently selected alkenyl group, which may be selected from the group consisting of vinyl and hexenyl. Starting material (A) may contain 0 to 6 mol %, alternatively 0.001 to 3 mol %, alternatively 0.005 to 0.2 mol %, of $R^3$, based on combined amounts of $R^1$, $R^2$, and $R^3$.

When starting material (A) has subscript p=2, and subscripts o=q=r=s=0, starting material (A) may comprise unit formula $M_2D_mD'_n$, where a quantity (m+n) is 100 to 10,000, and a ratio m/n is 1/1 to 500/1. Alternatively, the quantity (m+n) may be 200 to 9,900. Alternatively, the quantity (m+n) may be 300 to 7,000; and alternatively 400 to 6,000. Alternatively, the quantity (m+n) may be 1,000 to 5,000. Alternatively, the ratio m/n may be 10/1 to 400/1; and alternatively 20/1 to 300/1.

Starting material (A) can be made through condensation or equilibration reaction by using (meth)acryl functional silane reagents with reference to "Chemistry and Technology of Silicone" by Noll, Academic Press, 1968, chapter 5, p 190-245. Hereinafter, practical methods for the preparation of polydiorganosiloxane (A) are described as following, but not limited to these methods. For example, polydiorganosiloxane (A) can be made via one-pot synthesis using silanol fluid, (meth)acryl functional dialkoxysilane, and an endblocker in the presence of triflic acid catalyst. Heptane or toluene was used to facilitate the methanol removal by azeotropic distillation. Water was also added to the reaction to ensure complete hydrolysis of 3-methacryloxypropylmethyldimethoxysilane. After reaction was completed, neutralizers such as calcium carbonate were used to neutralize triflic acid, and filtered out after treatment. The other method is that it can be made via pre-hydrolysis of (meth)acryl functional dialkoxysilane and subsequent condensation/disproportionation reactions involving silanol fluid and an endblocker in the presence of phosphazene catalyst (described in U.S. Pat. No. 9,051,428 to Davio et al). Toluene was used to reduce the viscosity and facilitate the water/methanol removal by azeotropic distillation. After reaction was completed, neutralizers such as trialkylamines and disilazane derivatives were used to neutralize acidic catalyst, and filtered out after treatment.

Depending on selection of intermediates, various structure of polydiorganosiloxane (A) can be obtained. (Meth) acryl functional dialkoxysilane can be selected from 3-[dimethoxy(methyl)silyl]propyl methacrylate (CAS #14513-34-9) and 3-[dimethoxy(methyl)silyl]propyl acrylate (CAS #13732-00-8). Silanol fluid may be selected from be hydroxy-terminated polydimethylsiloxane (CAS #70131-67-8), hydroxy-terminated vinylmethylsiloxane-dimethylsiloxane copolymer (CAS #67923-19-7), hydroxy-terminated polyvinylmethylsiloxane (CAS #68083-20-5), hydroxy-terminated polyphenylmethylsiloxane (CAS #80801-30-5), diphenylsilanediol (CAS #947-42-2). An endblocker may be selected from hexamethyldisiloxane (CAS #107-46-0), 1,3-divinyltetramethyldisiloxane (CAS #2626-95-4), and dimethylvinylsiloxy-terminated polydimethylsiloxane (CAS #68083-19-2). Additionally, dialkoxy- or dichloro-silane, such as dimethoxydiphenylsilane (CAS #6843-66-9), dimethoxymethylvinylsilane (CAS #16753-62-1), dichlorodiphenylsilane (CAS #80-10-4), 3-mercaptopropylmethyldimethoxysilane (CAS #31001-77-1), dimethoxy(methyl)(3,3,3-trifluoropropyl)silane (CAS #358-67-8), diethoxy(methyl) phenylsilane (CAS #775-56-4), diethoxymethylsilane (CAS #2031-62-1), dimethoxymethylsilane (CAS #16881-77-9), can be added as co-reactants. Moreover, trialkoxysilane, and tetraalkoxysilane such as trimethoxy(methyl)silane (CAS #1185-55-3), 3-(trimethoxysilyl)propyl methacrylate (CAS #2530-85-0), 3-(triethoxysilyl)propyl methacrylate (CAS #21142-29-0), tetramethyl orthosilicate (CAS #681-84-5) can be added to obtain T''' and Q branched structures. Typical catalysts for condensation reaction were summarized in U.S. Pat. No. 8,076,411 to Maton et al.

Examples of polydiorganosiloxanes suitable for use as starting material (A) include one or more of the following average composition formulas: average formulas Ai) to Axiv), below). In the average composition formulas, the subscripts after each unit represent average number of that unit per molecule.

Ai) $(ViMe_2SiO_{1/2})_2(MaMeSiO_{2/2})_{10}(Me_2SiO_{2/2})_{1000}$

Aii) $(ViMe_2SiO_{1/2})_2(MaMeSiO_{2/2})_{50}(Me_2SiO_{2/2})_{2000}$

Aiii) $(ViMe_2SiO_{1/2})_2(MaMeSiO_{2/2})_{500}(Me_2SiO_{2/2})_{6000}$

Aiv) $(ViMe_2SiO_{1/2})_2(MaMeSiO_{2/2})_{1000}(Me_2SiO_{2/2})_{6000}$

Av) $(ViMe_2SiO_{1/2})_2(MaMeSiO_{2/2})_{50}(Me_2SiO_{2/2})_{1990}(ViMeSiO_{2/2})_{200}$

Avi) $(Me_3SiO_{1/2})_2(MaMeSiO_{2/2})_{50}(Me_2SiO_{2/2})_{1990}(ViMeSiO_{2/2})_{200}$

Avii) $(Me_3SiO_{1/2})_2(MaMeSiO_{2/2})_{50}(Me_2SiO_{2/2})_{1990}(HexMeSiO_{2/2})_{50}$ Aviii) $(Me_3SiO_{1/2})_2(MaMeSiO_{2/2})_{50}(Me_2SiO_{2/2})_{1990}(HexMeSiO_{2/2})_{50}$ Aix) $(ViMe_2SiO_{1/2})_2(MaMeSiO_{2/2})_{1000}(Me_2SiO_{2/2})_{6000}(PhMeSiO_{2/2})_{100}$ Ax) $(ViMe_2SiO_{1/2})_3(MaMeSiO_{2/2})_{100}(Me_2SiO_{2/2})_{1900}(MeSiO_{3/2})$ Axi) $(ViMe_2SiO_{1/2})_4(MaMeSiO_{2/2})_{50}(Me_2SiO_{2/2})_{3960}(SiO_{4/2})$ Axii) $(Me_3SiO_{1/2})_3(MaMeSiO_{2/2})_{20}(Me_2SiO_{2/2})_{1979}(ViMeSiO_{2/2})_{100}(MeSiO_{3/2})$ Axiii) $(ViMe_2SiO_{1/2})_2(MaMeSiO_{2/2})_{1000}(Me_2SiO_{2/2})_{6000}(PhPhSiO_{2/2})_{100}$ Axiv) $(ViMe_2SiO_{1/2})_2(MaMeSiO_{2/2})_{16}(Me_2SiO_{2/2})_{265}$ (B) Polyorganosilicate Resin Starting material (B) is a polyorganosilicate resin. The polyorganosilicate resin is used in the silicone hybrid pressure sensitive adhesive composition in an amount sufficient to provide a weight ratio of (B) the polyorganosilicate resin to (A) the polydiorganosiloxane (Resin/Polymer Ratio) of 0.15/1 to 4/1. Alternatively, the Resin/Polymer Ratio may be 0.2/1 to 3.5/1. Alternatively, the Resin/Polymer Ratio may be 0.3/1 to 3/1.

The polyorganosilicate resin comprises unit formula $M_aM''_bM'''_cD_dD'_eT'''_fQ_hX_i$, where M, M'', D, D', T''', and Q are as described above, M''' represents a unit of formula $(R^1_2R^2SiO_{1/2})$, X represents a hydroxyl group and/or alkoxy group, and subscripts a, b, c, d, e, f, h and i, have values such that a≥0, b≥0, c≥0, and a quantity (a+b+c)>10 mole %; d≥0, e≥0 and a quantity (d+e) is 0 to a number sufficient to provide up to 30 mole % of D units and D' units combined to the resin; f≥0, with the proviso that subscript f has a maximum value sufficient to provide 40 mole %, alternatively 30 mole %, of T''' units to the resin; h>0, with the proviso that subscript h has a value sufficient to provide 30 mole % to 70 mole %, alternatively 60 mole % of Q units to the resin; a+b+c+d+e+f+h=100 mole %; i≥0 is not included in the molar ratio, with the proviso that subscript i has a maximum value sufficient to provide 5 mole % of hydroxyl groups to the resin. Alternatively, the quantity (d+e) is 0 to a number sufficient to provide up to 20 mole % of D units and D' units combined to the resin. Alternatively, the quantity (d+e) is 0 to a number sufficient to provide up to 10 mole % of D units and D' units combined to the resin. Alternatively, the subscript h is 0 to a number sufficient to provide up to 15 mole % of T''' units to the resin. Alternatively, the subscript h is 0 to a number sufficient to provide up to 8 mole % of T''' units to the resin.

Alternatively, the polyorganosilicate resin may comprises a unit formula selected from the group consisting of $M_aQ_h$, $M_aM''_bQ_h$, $M_aM''_bM'''_cQ_h$, $M_aM'''_cQ_h$, $M_aD'_dQ_h$, $M_aD'_eQ_h$, $M_aM''_bD'_eQ_h$, $M_aM''_bT'''_fQ_h$, $M_aM''_bT'_fQ_h$, where subscript a, b and c is 20 to 70 mol %, subscript d and e is 1 to 20 mol %, subscript f is 1 to 25 mole %, and subscript h is 35 to 65 mole %. Alternatively, subscript a may be 20 to 65 mole %, subscript b and c may be 1 to 30 mole %, subscript d and e may be 1 to 20 mole %, subscript f may be 1 to 25 mole %, and subscript h may be 35 to 55 mole %.

The polyorganosilicate resin may contain 0 to 20 mol % of $R^2$ based on combined amounts of $R^1$, $R^2$, and $R^3$ groups in the resin, where $R^1$, $R^2$, and $R^3$ are as described above. The polyorganosilicate resin may contain at least 70 mol % of $R^1$ (based on combined amounts of $R^1$, $R^2$, and $R^3$ groups in the resin). Alternatively, the polyorganosilicate resin may contain 0 to 15 mol % of $R^2$ based on combined amounts of $R^1$, $R^2$, and $R^3$ groups in the resin. Alternatively, the polyorganosilicate resin may contain at least 80 mol % of $R^1$ (based on combined amounts of $R^1$, $R^2$, and $R^3$ groups in the resin.

Examples of polyorganosilicate resins suitable for use as starting material (B) include one or more of Bi) to Bxii) below.

Bi) $(Me_3SiO_{1/2})_{0.45}(SiO_{4/2})_{0.55}$
Bii) $(Me_3SiO_{1/2})_{0.50}(SiO_{4/2})_{0.50}$,
Biii) $(Me_3SiO_{1/2})_{0.42}(ViMe_2SiO_{1/2})_{0.05}(SiO_{4/2})_{0.53}(OH)_{0.02}$
Biv) $(Me_3SiO_{1/2})_{0.40}(ViMe_2SiO_{1/2})_{0.10}(SiO_{4/2})_{0.50}$
Bv) $(Me_3SiO_{1/2})_{0.42}(MaMe_2SiO_{2/2})_{0.05}(SiO_{4/2})_{0.53}(OH)_{0.02}$
Bvi) $(Me_3SiO_{1/2})_{0.4}(MaMe_2SiO_{2/2})_{0.2}(SiO_{4/2})_{0.40}$
Bvii) $(Me_3SiO_{1/2})_{0.42}(MaMe_2SiO_{3/2})_{0.05}(SiO_{4/2})_{0.53}$
Bviii) $(Me_3SiO_{1/2})_{0.4}(MaMe_2SiO_{3/2})_{0.2}(SiO_{4/2})_{0.40}$
Bix) $(Me_3SiO_{1/2})_{0.40}(ViMe_2SiO_{1/2})_{0.04}(MaMeSiO_{2/2})_{0.02}(SiO_{4/2})_{0.54}$
Bx) $(Me_3SiO_{1/2})_{0.40}(MaSiO_{1/2})_{0.04}(SiO_{4/2})_{0.56}$
Bxi) $(Me_3SiO_{1/2})_{0.40}(ViMe_2SiO_{1/2})_{0.02}(MaSiO_{1/2})_{0.02}(SiO_{4/2})_{0.56}$
Bxii) $(Me_3SiO_{1/2})_{0.42}(MaMe_2SiO_{1/2})_{0.05}(SiO_{4/2})_{0.53}$ Alternatively, the polyorganosilicate resin may be selected from the group consisting of Bi), Biii), Bv) and combination of Bi), Biii), and Bv).

The polyorganosilicate resin can be prepared by any suitable method, such as cohydrolysis of the corresponding silanes or by silica hydrosol capping methods. The polyorganosilicate resin may be prepared by silica hydrosol capping processes such as those disclosed in U.S. Pat. No. 2,676,182 to Daudt, et al.; U.S. Pat. No. 4,611,042 to Rivers-Farrell et al.; and U.S. Pat. No. 4,774,310 to Butler, et al. The method of Daudt, et al. described above involves reacting a silica hydrosol under acidic conditions with a hydrolyzable triorganosilane such as trimethylchlorosilane, a siloxane such as hexamethyldisiloxane, or mixtures thereof, and recovering a copolymer having M-units and Q-units. The resulting copolymers may contain from 1 to 5 percent by weight of hydroxyl groups.

The intermediates used to prepare the Polyorganosilicate Resin may have two, three or four hydrolyzable substituents per molecule, e.g., they may be diorganoalkoxysilanes, triorganoalkoxysilanes and silanes with four hydrolyzable substituents or alkali metal silicates. The intermediates may have formulas $R^M{}_2SiX^1{}_2$ and $R^MSiX^1{}_3$, respectively, where $R^M$ is selected from the group consisting of $R^1$, $R^2$, and $R^3$, described above, and $X^1$ represents a hydrolyzable substituent. Silanes with four hydrolyzable substituents may have formula $SiX^2{}_4$, where each $X^2$ is halogen, alkoxy or hydroxyl. Suitable alkali metal silicates include sodium silicate.

The polyorganosilicate resin prepared as described above typically contains silicon bonded hydroxyl groups, i.e., of formulae, $HOSi_{3/2}$, $HOR^MSiO_{2/2}$, and/or $HOR^M{}_2SiO_{1/2}$. The polyorganosilicate resin may comprise up to 5% of silicon bonded hydroxyl groups. The concentration of silicon bonded hydroxyl groups present in the polyorganosilicate resin may be determined using Fourier Transform-Infrared (FTIR) spectroscopy according to ASTM Standard E-168-16. For certain applications, it may be desirable for the amount of silicon bonded hydroxyl groups to be 2% or less, alternatively below 0.7%, alternatively below 0.3%, alternatively below 1%, and alternatively 0.3% to 0.8%. Silicon bonded hydroxyl groups formed during preparation of the polyorganosilicate resin can be converted to triorgano (e.g., trihydrocarbyl) siloxane groups or to a different hydrolyzable group by reacting the silicone resin with a silane, disiloxane, or disilazane containing the appropriate terminal group. Silanes containing hydrolyzable groups may be added in molar excess of the quantity required to react with the silicon bonded hydroxyl groups on the polyorganosilicate resin.

Alternatively, the polyorganosilicate resin may further comprises 2% or less, alternatively 0.7% or less, and alternatively 0.3% or less, and alternatively 0.3% to 0.8% of units represented by formula $X^2SiO_{3/2}$, $X^2R^MSiO_{2/2}$, and/or $X^2R^M{}_2SiO_{1/2}$ where $R^M$ and $X^2$ are as described above.

Alternatively, the polyorganosilicate resin may have terminal aliphatically unsaturated groups ($R^3$). The polyorganosilicate resin having terminal aliphatically unsaturated groups may be prepared by reacting the product of Daudt, et al. with an unsaturated organic group-containing endblocking agent and (optionally) an endblocking agent free of aliphatic unsaturation, in an amount sufficient to provide from 3 to 30 mole percent of unsaturated organic groups in the final product. Examples of endblocking agents include, but are not limited to, silazanes, siloxanes, and silanes. Suitable endblocking agents are known in the art and exemplified in U.S. Pat. Nos. 4,584,355; 4,591,622; and 4,585,836. A single endblocking agent or a mixture of such agents may be used to prepare such resin.

When prepared, the polyorganosilicate resin comprises the units described above, and the polyorganosiloxane further comprises the units with silanol (silicon bonded hydroxyl) groups and may comprise neopentamer of formula $Si(OSiR^M{}_3)_4$, where $R^M$ is as described above. $Si^{29}$ Nuclear Magnetic Resonance (NMR) spectroscopy, as described in U.S. Pat. No. 9,593,209 at col. 32, Reference Example 2, may be used to measure molar ratio of M and Q units, where said ratio is expressed as {M(resin)+(M(neopentamer)}/{Q(resin)+Q(neopentamer)} and represents the molar ratio of the total number of triorganosiloxy groups of the resinous and neopentamer portions of the polyorganosilicate resin to the total number of silicate groups (Q units) in the resinous and neopentamer portions.

The Mn of the polyorganosilicate resin depends on various factors including the types of hydrocarbyl groups represented by $R^M$ that are present. The Mn of the polyorganosilicate resin refers to the number average molecular weight measured using gel permeation chromatography (GPC) according to the procedure in U.S. Pat. No. 9,593,209 at col. 31, Reference Example 1, when the peak representing the neopentamer is excluded from the measurement. The Mn of the polyorganosilicate resin may be 1,500 g/mol to 5,000 g/mol.

Methods for the preparation of (meth)acryloxy-functional polyorganosilicate resin suitable for use as starting material (B), such as hydrolytic or non-hydrolytic condensation or equilibration of polyorganosilicate resins reacting with (meth)acryloxy-functional alkoxysilane or halosilane under acidic or basic condition; and such as condensation or equilibration following co-hydrolysis of typical organohalosilanes or organoalkoxysilanes with (meth)acryloxy-functional alkoxysilane or halosilane, will be known to those skilled in the art as similar methods for the preparation of organo-functional polyorganosilicate were described in U.S. Pat. No. 8,377,634 to Albaugh, U.S. Pat. No. 5,516,858 to Morita et al, U.S. Pat. No. 9,023,433 to Fu et al, U.S. Pat. No. 6,281,285 to Becker et al. and U.S. Pat. No. 5,010,159 to Bank et al. (Meth)acryloxy-functional alkoxysilane or halosilane can be selected from 3-(chlorodimethylsilyl)propyl methacrylate (CAS #24636-31-5), 3-[dimethoxy (methyl)silyl]propyl methacrylate (CAS #14513-34-9), methacryloxypropylmethyldichlorosilane (CAS #18301-56-9), (3-acryloxypropyl)methyldichlorosilane (CAS #71550-63-5), 3-[dimethoxy(methyl)silyl]propyl acrylate (CAS #13732-00-8), 3-(trimethoxysilyl)propyl acrylate (CAS #4369-14-6), 3-[diethoxy(methyl)silyl]propyl Methacrylate (CAS #65100-04-1), 3-(trimethoxysilyl)propyl Methacrylate (CAS #2530-85-0), 3-(triethoxysilyl)propyl methacrylate (CAS #21142-29-0), methacryloxypropyltrichlorosilane (CAS #7351-61-3), (3-acryloxypropyl)trichlorosilane (CAS #38595-89-0).

Another method for the preparation of (meth)acryloxy-functional polyorganosilicate resin suitable for use as starting material (B), such as hydrosilylation reaction between hydrosilyl (—SiH) functional polyorganosilicate and (meth)acryl functional alkene or alkyne; or between alkenyl functional polyorganosilicate and (meth)acryl functional hydrosilane, as descried in U.S. Pat. No. 4,503,208 to Lin et al, "Macromolecular Materials and Engineering" by Hung-Wen et al, Vol. 292, Issue 5, page 666-673 (2007). (Meth) acryl functional alkene or alkyne can be selected from allyl methacrylate (CAS #96-05-9) and propargyl acrylate (CAS #10477-47-1). (Meth)acryl functional hydrosilane can be selected from methacryloxypropyltris(dimethylsiloxy)silane (CAS #17096-08-1) and 2-Propenoic acid, 2-methyl-3-(1,1,3,3-tetramethyldisiloxanyl)propylester (CAS #96474-12-3).

(C) Polyorqanohydrogensiloxane

Starting material (C) in the silicone hybrid pressure sensitive adhesive composition is a polyorganohydrogensiloxane comprising unit formula $M_tM^H_uD_vD^H_wT_xT^H_yQ_z$, where M, D, and Q represent units of the formulas shown above, and $M^H$ represents a unit of formula $(HR^1_2SiO_{1/2})$, $D^H$ represents a unit of formula $(HR^1SiO_{2/2})$, T represents a unit of formula $(R^1SiO_{3/2})$, and $T^H$ represents a unit of formula $(HSiO_{3/2})$; and subscripts t, u, v, w, x, y, and z have values such that t≥0, u≥0, v≥0, w 0, x≥0, y≥0, z≥0, a quantity (u+w+y)≥3, and a quantity (t+u+v+w+x+y+z) is sufficient to give the polyorganohydrogensiloxane a viscosity of 3 mPa·s to 1,000 mPa·s at 25° C., alternatively 5 mPa·s to 500 mPa·s at 25° C.; and where $R^1$ is as described above. Alternatively, the quantity (t+u+v+w+x+y+z) may be 3 to 2,000; alternatively 3 to 1,000; and alternatively 3 to 500. Alternatively, when subscript x=y=z=0, the polyorganohydrogensiloxane may comprise unit formula $M_tM^H_uD_vD^H_w$, where a quantity (t+u)=2, and a quantity (u+w)≥3.

Polyorganohydrogensiloxanes for starting material (C) are exemplified by:
Ci) dimethylhydrogensiloxy-terminated poly(dimethylsiloxane/methylhydrogensiloxane),
Cii) dimethylhydrogensiloxy-terminated polymethylhydrogensiloxane,
Ciii) trimethylsiloxy-terminated poly(dimethylsiloxane/methylhydrogensiloxane),
Civ) trimethylsiloxy-terminated polymethylhydrogensiloxane
Cv) dimethylhydrogensiloxy-terminated polydimethylsiloxane, and
Cvi) a combination of two or more of Ci) to Cv).

Methods of preparing polyorganohydrogensiloxanes suitable for use as starting material (C), such as hydrolysis and condensation of organohalosilanes, are well known in the art. Furthermore, polyorganohydrogensiloxanes are known in the art and are commercially available, e.g., from Dow Silicones Corporation of Midland, Michigan, USA.

Starting materials (A), (B), and (C), and the amounts of each, are sufficient to provide to the silicone hybrid pressure sensitive adhesive composition, a molar ratio of silicon bonded hydrogen atoms in starting material (C) to aliphatically unsaturated monovalent hydrocarbon groups $R^3$ in starting materials (A) and/or (B) (SiH/Vi ratio) of >0.2/1. Alternatively, the SiH/Vi ratio may be 0.21/1 to 22.0/1; alternatively, the SiH/Vi ratio may be 0.23/1 to 12.5/1; alternatively, the SiH/Vi ratio may be 0.23/1 to 0.9/1; and alternatively, the SiH/Vi ratio may be 0.23/1 to 0.6/1.

Starting materials (A), (B), and (C), and the amounts of each, are sufficient to provide to the silicone hybrid pressure sensitive adhesive composition, a molar ratio of silicon bonded hydrogen atoms in starting material (C) to reactive groups in starting materials (A) and/or (B) (SiH/Reactive Group ratio) of <0.34/1, where the reactive groups are $R^2$ and $R^3$ (as defined above) combined. The SiH/Reactive Group ratio is lower than the SiH/Vinyl ratio. Alternatively, the SiH/Reactive Group ratio may be 0.05/1 to 0.33/1; alternatively 0.05/1 to 0.3/1; alternatively 0.07/1 to 0.27/1; and alternatively 0.1/1 to 0.25/1.

(D) Hydrosilylation Reaction Catalyst

Starting material (D) in the silicone hybrid pressure sensitive adhesive composition is a hydrosilylation reaction catalyst. Hydrosilylation reaction catalysts include platinum group metal catalysts. For example, the hydrosilylation reaction catalyst can be Di) a metal selected from platinum, rhodium, ruthenium, palladium, osmium, and iridium. Alternatively, the hydrosilylation reaction catalyst may be Dii) a compound of such a metal, for example, chloridotris(triphenylphosphane)rhodium(I) (Wilkinson's Catalyst), a rhodium diphosphine chelate such as [1,2-bis(diphenylphosphino)ethane]dichlorodirhodium or [1,2-bis(diethylphospino)ethane]dichlorodirhodium, chloroplatinic acid (Speier's Catalyst), chloroplatinic acid hexahydrate, platinum dichloride; or Diii) a complex of such a compound with a low molecular weight organopolysiloxane. Alternatively, the hydrosilylation reaction catalyst may be Div) the compound microencapsulated in a matrix or core/shell type structure. For example, complexes of platinum with low molecular weight organopolysiloxanes include 1,3-diethenyl-1,1,3,3-tetramethyldisiloxane complexes with platinum (Karstedt's Catalyst). Alternatively, the hydrosilylation reaction catalyst may be Dv) the complex microencapsulated in a resin matrix. Exemplary hydrosilylation reaction catalysts are described in U.S. Pat. Nos. 3,159,601; 3,220,972; 3,296, 291; 3,419,593; 3,516,946; 3,814,730; 3,989,668; 4,766,176; 4,784,879; 5,017,654; 5,036,117; and 5,175,325 and EP 0 347 895 B. Suitable hydrosilylation reaction catalysts are known in the art and are commercially available. For example, SYL-OFF™ 4000 Catalyst and SYL-OFF™ 2700 are available from Dow Silicones Corporation of Midland, Michigan, USA.

The amount of catalyst used herein will depend on various factors including the selection of starting materials A), B), and C) and their respective contents of aliphatically unsaturated monovalent hydrocarbon groups and silicon bonded hydrogen atoms, and whether an inhibitor is present, however, the amount of catalyst is sufficient to catalyze hydrosilylation reaction of SiH and aliphatically unsaturated monovalent hydrocarbon groups, alternatively the amount of catalyst is sufficient to provide 1 ppm to 1000 ppm of the platinum group metal based on combined weights of all starting materials in the silicone hybrid pressure sensitive adhesive composition; alternatively 2 ppm to 500 ppm, and alternatively 10 ppm to 100 ppm, on the same basis.

(E) Photoradical Initiator

Starting material (E) in the silicone hybrid pressure sensitive adhesive composition is a photoradical initiator. Suitable photoradical initiators include UV initiators such as benzophenone derivatives, acetophenone derivatives (α-hydroxy ketone), benzoin and its alkyl esters, phosphine oxide derivatives, xanthone derivatives, oxime ester derivatives, and camphor quinone. Photoradical initiators are commercially available. For example, photoradical initiators suitable for use herein include 2,6-bis(4-azido benzylidene)cyclohexanone, 2,6-bis(4-azido benzylidene)-4-methylcyclohexanone, 1-hydroxy-cyclohexyl-phenyl-ketone (IRGACURE™ 184), 2-methyl-1[4-(methylthio)phenyl]-2-morpholinopropane-1-one (IRGACURE™ 907); 2-hydroxy-2-methyl-1-phenyl-propane-1-one (DAROCUR™ 1173); a mixed initiator (IRGACURE™ 500) of 50% of IRGACURE™ 184C and 50% of benzophenone; a mixed initiator (IRGACURE™ 1000) of 20% of IRGACURE™ 184C and 80% of DAROCUR™ 1173; 2-hydroxy-1-[4-(2-hydroxyethoxy)phenyl]-2-methyl-1-propanone (IRGACURE™ 2959); methylbenzoylformate (DAROCUR™ MBF); alpha, alpha-dimethoxy-alpha-phenylacetophenone (IRGACURE™ 651); 2-benzyl-2-(dimethylamino)-1-[4-(4-morpholinyl)phenyl]-1-butanone (IRGACURE™ 369); a mixed initiator (IRGACURE™ 1300) of 30% of IRGACURE™ 369 and 70% of IRGACURE™ 651; Diphenyl(2,4,6-trimethylbenzoyl)phosphine oxide (IRGACURE™ TPO), Ethyl (2,4,6-trimethylbenzoyl) phenyl phosphinate (IRGACURE™ TPO-L), propriety oxime ester compounds (N-1919, NCI-831, NCI-930, NCI-730, and NCI-100 supplied from Adeka Corporation), thioxanthen-9-one; 10-methylphenothiazine; isopropyl-9H-thioxanthen-9-one; 2,4-diethyl-9H-thioxanthen-9-one; 2-chlorothioxanthen-9-one; 1-chloro-4-propoxy-9H-thioxanthen-9-one; or a combination of two or more thereof. The photoradical initiators with the DAROCUR™ and IRGACURE™ brands are commercially available from BASF SE of Ludwigshafen, Germany. Alternatively, the photoradical initiator may be selected from the group consisting of Ei) benzophenone, Eii) a substituted benzophenone compound, Eiii) acetophenone, Eiv) a substituted acetophenone compound, Ev) benzoin, Evi) an alkyl ester of benzoin, Evii) a substituted phosphine oxide compound, Eviii) xanthone, and Eix) a substituted xanthone; and Ex) a combination of two or more of Ei) to Eix). Alternatively, the photoradical initiator may be a substituted acetophenone, such as 1-hydroxycyclohexyl phenyl ketone. The type of photoradical initiator is not specifically restricted, however, some photoradical initiator, especially those containing thioether group, phosphinate, or phosphine oxide group, may inhibit the hydrosilylation reaction catalyst, therefore, when such a photoradical initiator will be included, the appropriate amount of (D) hydrosilylation reaction catalyst and (1) the additive need to be controlled and/or cure temperature/time is needed to be adjusted.

The amount of photoradical initiator in the silicone hybrid pressure sensitive adhesive composition will depend on various factors including the desired reaction rate, the photoinitiator used, and the selection and amount of starting materials (A) and (B) and their respective contents of (meth)acryloxyalkyl groups, however, the amount may be 0.1 weight % to 10 weight %, based on combined weights of starting materials (A), (B), and (C), alternatively 1 weight % to 5 weight % on the same basis.

(F) Hydrosilylation Reaction Inhibitor

Starting material (F) in the silicone hybrid pressure sensitive adhesive composition is a hydrosilylation reaction inhibitor (inhibitor) that may optionally be used for altering rate of reaction of the silicon bonded hydrogen atoms and the aliphatically unsaturated hydrocarbon groups of starting materials (A), (B), and (C), as compared to reaction rate of the same starting materials but with the inhibitor omitted. Inhibitors are exemplified by acetylenic alcohols such as dimethyl hexynol, and 3,5-dimethyl-1-hexyn-3-ol, 1-butyn-3-ol, 1-propyn-3-ol, 2-methyl-3-butyn-2-ol, 3-methyl-1-butyn-3-ol, 3-methyl-1-pentyn-3-ol, 3-phenyl-1-butyn-3-ol, 4-ethyl-1-octyn-3-ol, 3,5-dimethyl-1-hexyn-3-ol, and 1-ethynyl-1-cyclohexanol (ETCH), and a combination thereof; cycloalkenylsiloxanes such as methylvinylcyclosiloxanes exemplified by 1,3,5,7-tetramethyl-1,3,5,7-tetravinylcyclotetrasiloxane, 1,3,5,7-tetramethyl-1,3,5,7-tetrahexenylcyclotetrasiloxane, and a combination thereof; ene-yne compounds such as 3-methyl-3-penten-1-yne, 3,5-dimethyl-3-hexen-1-yne, and a combination thereof; triazoles such as benzotriazole; phosphines; mercaptans; hydrazines; amines, such as tetramethyl ethylenediamine, 3-dimethylamino-1-propyne, n-methylpropargylamine, propargylamine, and 1-ethynylcyclohexylamine; fumarates including dialkyl fumarates such as diethyl fumarate and/or dialkenyl fumarates such as diallyl fumarate and/or dialkoxyalkyl fumarates, maleates such as diallyl maleate and diethyl maleate; nitriles; ethers; carbon monoxide; alkenes such as cyclo-octadiene, divinyltetramethyldisiloxane; alcohols such as benzyl alcohol; and a combination thereof.

Alternatively, the inhibitor may be a silylated acetylenic compound. Without wishing to be bound by theory, it is thought that adding a silylated acetylenic compound reduces yellowing of the reaction product prepared from hydrosilylation reaction as compared to a reaction product from hydrosilylation of starting materials that do not include a silylated acetylenic compound or that include an organic acetylenic alcohol inhibitor, such as those described above.

The silylated acetylenic compound is exemplified by (3-methyl-1-butyn-3-oxy)trimethylsilane, ((1,1-dimethyl-2-propynyl)oxy)trimethylsilane, bis(3-methyl-1-butyn-3-oxy)dimethylsilane, bis(3-methyl-1-butyn-3-oxy)silanemethylvinylsilane, bis((1,1-dimethyl-2-propynyl)oxy)dimethylsilane, methyl(tris(1,1-dimethyl-2-propynyloxy))silane, methyl(tris(3-methyl-1-butyn-3-oxy))silane, (3-methyl-1-butyn-3-oxy)dimethylphenylsilane, (3-methyl-1-butyn-3-oxy)dimethylhexenylsilane, (3-methyl-1-butyn-3-oxy)triethylsilane, bis(3-methyl-1-butyn-3-oxy)methyltrifluoropropylsilane, (3,5-dimethyl-1-hexyn-3-oxy)trimethylsilane, (3-phenyl-1-butyn-3-oxy)

diphenylmethylsilane, (3-phenyl-1-butyn-3-oxy) dimethylphenylsilane, (3-phenyl-1-butyn-3-oxy) dimethylvinylsilane, (3-phenyl-1-butyn-3-oxy) dimethylhexenylsilane, (cyclohexyl-1-ethyn-1-oxy) dimethylhexenylsilane, (cyclohexyl-1-ethyn-1-oxy) dimethylvinylsilane, (cyclohexyl-1-ethyn-1-oxy) diphenylmethylsilane, (cyclohexyl-1-ethyn-1-oxy) trimethylsilane, and combinations thereof. Alternatively, the silylated acetylenic compound is exemplified by methyl(tris (1,1-dimethyl-2-propynyloxy))silane, ((1,1-dimethyl-2-propynyl)oxy)trimethylsilane, or a combination thereof. The silylated acetylenic compound useful as the inhibitor herein may be prepared by methods known in the art, for example, U.S. Pat. No. 6,677,740 discloses silylating an acetylenic alcohol described above by reacting it with a chlorosilane in the presence of an acid receptor. Alternatively, the hydrosilylation reaction inhibitor may be selected from the group consisting of acetylenic alcohols, cycloalkenylsiloxanes, ene-yne compounds, triazoles, phosphines, mercaptans, hydrazines, amines, fumarates, maleates, nitriles, ethers, carbon monoxide, alcohols, and silylated acetylenic alcohols. Alternatively, the hydrosilylation reaction inhibitor may be an acetylenic alcohol, such as ETCH.

The amount of inhibitor used herein will depend on various factors including the desired reaction rate, the particular inhibitor used, and the selection and amount of starting materials (A), (B), and (C). However, when present, the amount of inhibitor may be 10 ppm to 5,000 ppm based on combined weights of starting materials (A), (B), and (C); alternatively, 20 ppm to 2,000 ppm on the same basis.

(G) Free Radical Scavenger

Starting material (G) is a free radical scavenger (scavenger) that may be used to control or inhibit a radical reaction of the silicone hybrid pressure sensitive adhesive composition. Because the silicone hybrid pressure sensitive adhesive composition comprises reactive (meth)acrylate groups, a viable free radical scavenger may be present to prevent premature reaction, for example, in storage and during use of the protective film prepared using the silicone hybrid pressure sensitive adhesive composition. Scavengers comprising phenolic compounds are one class of such materials that may be used in the invention, including, for example, 4-methoxyphenol (MEHQ, methyl ether of hydroquinone), hydroquinone, 2-methyl hydroquinone, 2-t-butylhydroquinone, t-butyl catechol, butylated hydroxy toluene, and butylated hydroxy anisole, combinations of two or more thereof. Other scavengers that may be used include phenothiazine and anaerobic inhibitors, such as the NPAL type inhibitors (tris-(N-nitroso-N-phenylhydroxylamine) aluminum salt) from Albemarle Corporation, Baton Rouge, La. Alternatively, the free radical scavenger may be selected from the group consisting of a phenolic compound, phenothiazine and an anaerobic inhibitor.

Free radical scavengers are known, for example, in U.S. Pat. No. 9,475,968, and are commercially available. The amount of scavenger in the silicone hybrid pressure sensitive adhesive composition will depend on various factors including the type and amount of (meth)acryloxyalkyl groups in starting materials (A) and (B), however the scavenger may be present in an amount of 5 ppm to 2,000 ppm based on combined weights of starting materials (A), (B), and (C); alternatively 10 ppm to 1,500 ppm on the same basis.

(H) Solvent

Starting material (H) in the silicone hybrid pressure sensitive adhesive composition is a solvent. The solvent may be added during preparation of the silicone hybrid pressure sensitive adhesive composition, for example, to aid mixing and delivery of one or more starting materials when preparing the silicone hybrid pressure sensitive adhesive composition and/or to facilitate coating the silicone hybrid pressure sensitive adhesive composition on a substrate, as described hereinbelow. When preparing the silicone hybrid pressure sensitive adhesive composition, certain starting materials may be delivered in solvent, such as the polyorganosilicate resin and/or the hydrosilylation reaction catalyst. Suitable solvents include organic liquids exemplified by, but not limited to, aromatic hydrocarbons, aliphatic hydrocarbons, ketones, esters, ethers, glycols, glycol ethers. Hydrocarbons include benzene, toluene, xylene, naphtha, hexane, cyclohexane, methylcyclohexane, heptane, octane, decane, hexadecane, isoparaffin such as Isopar L (C11-C13), Isopar H(C11-C12), hydrogenated polydecene. Suitable ketones include, but are not limited to, acetone, methylethyl ketone, 2-pentanone, 3-pentanone, 2-hexanone, 2-heptanone, 4-heptanone, methyl isobutyl ketone, diisobutylketone, acetonylacetone, and cyclohexanone. Esters include ethyl acetate, propyl acetate, isopropyl acetate, butyl acetate, and isobutyl acetate. Ethers include diethyl ether, dipropyl ether, diisopropyl ether, dibutyl ether, 1,2-dimethoxyethane, and 1,4-dioxane. Solvents having both ester and ether moieties include 2-methoxyethyl acetate, 2-ethoxyethyl acetate, propylene glycol monomethyl ether acetate, and 2-butoxyethyl acetate; Ethers and esters further include, isodecyl neopentanoate, neopentylglycol heptanoate, glycol distearate, dicaprylyl carbonate, diethylhexyl carbonate, propylene glycol n-propyl ether, propylene glycol-n-butyl ether, ethyl-3 ethoxypropionate, propylene glycol methyl ether acetate, tridecyl neopentanoate, propylene glycol methylether acetate (PGMEA), propylene glycol methylether (PGME), dipropylene glycol methyl ether, or ethylene glycol n-butyl ether, octyldodecyl neopentanoate, diisobutyl adipate, diisopropyl adipate, propylene glycol dicaprylate/dicaprate, octyl ether, and octyl palmitate. Alternatively, the solvent may be selected from polyalkylsiloxanes, ketones, glycol ethers, tetrahydrofuran, mineral spirits, naphtha, or a combination thereof. Polyalkylsiloxanes with suitable vapor pressures may be used as the solvent, and these include hexamethyldisiloxane, octamethyltrisiloxane, hexamethylcyclotrisiloxane, octamethylcyclotetrasiloxane, decamethylcyclopentasiloxane, tris(trimethylsiloxy)methylsilane, tetrakis (trimethylsiloxy)silane, dodecamethylcyclohexasiloxane, octamethyltrisiloxane, decamethyltetrasiloxane, dodecamethylpentasiloxane, tetradecamethylhexasiloxane, hexadecamethylheptasiloxane, heptamethyl-3-{(trimethylsilyl) oxy)}trisiloxane, hexamethyl-3,3, bis{(trimethylsilyl) oxy}trisiloxane pentamethyl{(trimethylsilyl) oxy}cyclotrisiloxane, and combinations thereof. Low molecular weight polyalkylsiloxanes, such as 0.5 to 1.5 cSt polydimethylsiloxanes are known in the art and commercially available as DOWSIL™ 200 Fluids and DOWSIL™ OS FLUIDS, which are commercially available from Dow Silicones Corporation. Alternatively, the solvent may be selected from the group consisting of an aliphatic hydrocarbon, an aromatic hydrocarbon, an ether, an ester, and a solvent having both ether and ester moieties.

The amount of solvent will depend on various factors including the type of solvent selected and the amount and type of other starting materials selected. However, when present, the amount of solvent may be 0 to 90 weight % based on combined weights of all starting materials in the silicone hybrid pressure sensitive adhesive composition, alternatively 0 to 60% on the same basis.

(I) Additive

The silicone hybrid pressure sensitive adhesive composition may optionally further comprise an additive, such as Ii) a synergist, Iii) a chain transfer agent (a hydrogen donor), Iiii) a sensitizer, a combination of two or more of additives Ii) to Iv). The additive described above may help to improve UV sensitivity, and may reduce one or more of oxygen inhibition and adhesive force of the silicone hybrid pressure sensitive adhesive when exposed to UV radiation. Suitable type of additives are summarized in "*The formulator's guide to anti-oxygen inhibition additives.*" Progress in Organic Coatings 77.11 (2014): 1789-1798 by Husár, Branislav, et al. and PCT Publication WO2017182638A1. The type of additive is not specifically restricted, however, some additives, especially those containing mercpato group, phosphine, or phosphine oxide group, may inhibit the hydrosilylation reaction catalyst, therefore, when such an additive will be included, the appropriate amount of (D) hydrosilylation reaction catalyst and (I) additive need to be controlled and/or cure temperature/time is needed to be adjusted. The amount of additive may be 0 to 5 parts by weight, alternatively 0 to 2 parts by weight, per 100 parts by weight of starting material (A). Examples of commercially available additives are below.

The synergist may be selected from amine-containing compounds consisting of tertiary amine, glycine, oxime, aminobenzoates, acrylated amines, amine modified acrylates, and a combination of at least two of these synergists. Examples of tertiary amine, and aminobenzoates are commercially available and include, but are not limited to, N-methyl diethanolamine (CAS #105-59-9; Sigma-Aldrich), p-tolyldiethanolamine (CAS #3077-12-1), n-ethyldiisopropylamine (CAS #7087-68-5, Sigma-Aldrich), 2-(diisopropylamino)ethanol (CAS #96-80-0, Sigma-Aldrich), N-phenyl glycine (CAS #103-01-5, TCI), Speed Cure PDO (Lambson), ethyl 4-(dimethylamino)benzoate (CAS #10287-53-3, TCI), 2-ethylhexyl 4-(dimethylamino)benzoate (CAS #21245-2-3), Speedcure EDB (Lamson), Speedcure DMB (Lamson), Speedcure EHA (Lamson), Speedcure BDMB (Lamson), Speedcure XFLM01 (Lamson), Speedcure XFLM02 (Lamson), Speedcure EMD (Lamson), Speedcure BEDB (Lamson), Speedcure 7040 (Lamson), Speedcure EPD (Lamson), Dimethylamine borane (CAS #74-94-2 Sigma-Aldrich), N-vinyl pyrrolidone (BASF). Examples of amine modified acrylates and acrylated amines are also commercially available and include, but are not limited to, 2-(dimethylamino)ethyl methacrylate (CAS #2867-47-2, TCI), 2-(dimethylamino)ethyl acrylate (CAS #2439-35-2, TCI), N-[3-(Dimethylamino)propyl]acrylamide (CAS #3845-76-9, TCI), Ebecryl P115 (Allnex), Ebecryl 7100 (Allnex), Ebecryl 80 (Allnex), Ebecryl 81 (Allnex), Ebecryl 83 (Allnex), Ebecryl 85 (Allnex), Ebecryl 880 (Allnex), Ebecryl LE010551 (Allnex), Ebecryl LE010552 (Allnex), Ebecryl LE010553 (Allnex), Ebecryl 3600 (Allnex), Ebecryl 3703 (Allnex), DEAEMA (BASF). DMAEMA (BASF), TBAEMA (BASF), Genomer 5271 (Rahn), Genomer 5142 (Rahn), Genomer 5161 (Rahn), Genomer 5275 (Rahn), CN UVA 421 (Sartomer), CN3702 (Sartomer), CN3715 (Sartomer), CN3715 LM (Sartomer), CN3755 (Sartomer), CN381 (Sartomer), CN 386 (Sartomer), CN501 (Sartomer), The amount of the synergist can be 0.01 part by weight to 10 parts by weight, alternatively 0.1 part to 2.0 part, per 1 part by weight of the photoinitiator (E).

The chain transfer agent may be selected from mercapto-containing compounds and any other hydrogen donors. Examples of pentaerythritol tetrakis(3-mercaptopropionate) (CAS #7575-23-7; Sigma-Aldrich), trimethylolpropane tris (3-mercaptopropionate) (CAS #33007-83-9; Sigma-Aldrich), tris(trimethyl silyl)silane (CAS #1873-77-4, Alfa Aesar), 3-mercaptopropyl(dimethoxy)methylsilane (CAS #31001-77-1; TCI), (3-Mercaptopropyl)trimethoxysilane (CAS #4420-74-0; TCI), mercaptosiloxane (CAS 102783-03-9; Gelest), and 1-hexanthiol (CAS #111-31-9, Sigma-Aldrich). The amount of the chain transfer agent can be 0.01 part by weight to 10 parts by weight, alternatively 0.1 part to 2.0 part, per 1 part by weight of the photoinitiator (E).

Alternatively, the synergist may be a sensitizer, such as those disclosed in PCT Publication WO2015194654A1 and U.S. Pat. No. 4,250,053. Useful sensitizers include 2-isopropylthioxanthone, 1,3-diphenyl-2-pyrazoline, and 1,3-diphenylisobenzofuran. Other examples of the sensitizer include anthracene compounds, 4-methoxy-1-naphthol, fluorene, pyrene, and stilbene. Examples of the anthracene compound include anthracene, 9,10-dimethoxyanthracene, 9,10-diethoxyanthracene, 9,10-dipropoxyanthracene, 2-ethyl-9,10-dimethoxyanthracene, 2-ethyl-9,10-Diethoxyanthracene, 2-ethyl-9,10-dipropoxyanthracene, 4'-nitrobenzyl-9,10-dimethoxyanthracene-2-sulfonate, 4'-nitrobenzyl-9,10-diethoxyanthracene-2-sulfonate and 4'-nitrobenzyl-9,10-dipropoxyanthracene-2-sulfonate. Sensitizers are commercially available, e.g., under the tradename Anthracure UVS-1331, 1221, 1101, and ET-2111 (manufactured by Kawasaki Kasei Kogyo Co., Ltd.). The amount of the sensitizer can be 0.01 part by weight to 10 parts by weight, alternatively 0.1 part to 2.0 part, per 1 part by weight of the photoinitiator (E).

(J) Filler

The silicone hybrid pressure sensitive adhesive composition may optionally further comprise an inorganic filler, e.g., a silica filler such as fumed silica and/or precipitated silica. Without wishing to be bound by theory, it is thought that because the adhesive article prepared using the silicone hybrid pressure sensitive adhesive composition can be vulnerable to a certain external pressure due to very low crosslinking density, addition of a filler may reinforce cohesive strength (or mechanical strength or toughness). However, the amount and type of filler should be selected such that the filler does not significantly impact the ability of the silicone hybrid pressure sensitive adhesive composition to adhere and conform to an uneven surface. Examples of surface treated fumed silicas for use include commercially available treated silicas, such as from Degussa Corporation under the tradename AEROSIL™, such as AEROSIL™ R8200, R9200, R812, R812S, R972, R974, R805, R202; Cabot Corporation under the tradename CAB-O-SIL™ ND-TS, TS610 or TS710; Tokuyama Corporation under the tradename REOLOSIL™, such as DM-10, DM-20S, DM-30, HM-30S, MT-10, PM-20L, QS-10, QS-20A, and QS-25C. The amount of starting material (J) depends on various factors including the additive selected and the conditions for preparing the silicone hybrid pressure sensitive adhesive composition, however, the amount of filler may be 0 to 30 weight %, alternatively 1% to 30%, alternatively 1% to 20%, and alternatively 5% to 15%, based on combined weights of starting materials (A) and (B).

(K) Bis-SiH-Terminated Polydiorganosiloxane

Optionally, a bis-SiH-terminated polydiorganosiloxane may be used in addition to starting material (C) in the silicone hybrid pressure sensitive adhesive composition. This polydiorganosiloxane may have unit formula $M^H_2 D_k$, where $M^H$ and D units are as described above, and subscript k 1, alternatively $1 \leq k \leq 500$. Suitable polydiorganosiloxanes for starting material (K) include dimethylhydrogensiloxy-terminated polydimethylsiloxanes and dimethylhydrogensiloxy-terminated polydiphenylsiloxanes. When present, the weight ratio of starting material (K) to starting material (C) [(K)/(C) ratio] may be 0.25/1 to 4/1.

When selecting starting materials for the silicone hybrid pressure sensitive adhesive composition described above, there may be overlap between types of starting materials because certain starting materials described herein may have more than one function. For example, certain reducing agents may also function as hydrosilylation reaction inhibitors (e.g., phosphines such as triphenyl phosphine). When adding additional starting materials to the silicone hybrid pressure sensitive adhesive composition, the additional starting materials are distinct from one another and from the required starting materials in the silicone hybrid pressure sensitive adhesive composition.

Method for Preparing the Silicone Hybrid Pressure Sensitive Adhesive Composition The silicone hybrid pressure sensitive adhesive composition can be prepared by a method comprising combining all starting materials by any convenient means such as mixing at RT, or at elevated temperature. The hydrosilylation reaction inhibitor may be added before the hydrosilylation reaction catalyst, for example, when the silicone hybrid pressure sensitive adhesive composition will be prepared at elevated temperature and/or the silicone hybrid pressure sensitive adhesive composition will be prepared as a one part composition.

Alternatively, the silicone hybrid pressure sensitive composition may be prepared as a multiple part composition, for example, when the silicone hybrid pressure sensitive adhesive composition will be stored for a long period of time before use. In the multiple part composition, the hydrosilylation reaction catalyst is stored in a separate part from any starting material having a silicon bonded hydrogen atom, for example the polyorganohydrogensiloxane, and the parts are combined shortly before use of the silicone hybrid pressure sensitive adhesive composition. For example, a two part composition may be prepared by combining starting materials comprising starting material (C) the polyorganohydrogensiloxane, all or a portion of starting materials (A) and (B), and optionally all or a portion of (H) the solvent, and optionally one or more other additional starting materials described above to form a base part, by any convenient means such as mixing. A curing agent may be prepared by combining starting materials comprising starting materials (D) the hydrosilylation reaction catalyst and all or a portion of starting materials (A) and (H), and optionally one or more other additional starting materials described above by any convenient means such as mixing. The starting materials may be combined at ambient or elevated temperature. Starting material (F) the hydrosilylation reaction inhibitor may be included in one or more of the base part, the curing agent part, or a separate additional part. Starting material (B), the polyorganosilicate resin, may be added to the base part, the curing agent part, or a separate additional part. Starting Material (E) the photoradical initiator and starting material (G) the free radical scavenger may be added to the base part or a separate additional (e.g., third) part. When a two part composition is used, the weight ratio of amounts of base part to curing agent part may range from 1:1 to 10:1. The silicone hybrid pressure sensitive adhesive composition will cure via hydrosilylation reaction to form a pressure sensitive adhesive.

Preparation of an Adhesive Article

The method described above may further comprise one or more additional steps. The silicone hybrid pressure sensitive adhesive composition prepared as described above may be used to form an adhesive article, e.g., a silicone hybrid pressure sensitive adhesive (prepared by thermal cure of the silicone hybrid pressure sensitive adhesive composition described above) on a surface of a substrate. The method described above may, therefore, further comprises applying the silicone hybrid pressure sensitive adhesive composition to a substrate, e.g., a web-based substrate.

Applying the silicone hybrid pressure sensitive adhesive composition to the web-based substrate can be performed by any convenient means. For example, the silicone hybrid pressure sensitive adhesive composition may be applied onto a web-based substrate by gravure coater, offset coater, offset-gravure coater, roller coater, reverse-roller coater, air-knife coater, or curtain (slot-die) coater.

The substrate can be any material that can withstand the curing conditions (described below) used to cure the pressure sensitive adhesive curable composition to form the silicone hybrid pressure sensitive adhesive on the substrate. For example, any substrate that can withstand heat treatment at a temperature equal to or greater than 120° C., alternatively 150° C. is suitable. Examples of materials suitable for such substrates including plastic films such as polyimide (PI), polyetheretherketone (PEEK), polyethylene naphthalate (PEN), liquid-crystal polyarylate, polyamideimide (PAI), polyether sulfide (PES), polyethylene terephthalate (PET), PE (polyethylene), and PP (polypropylene). The thickness of the substrate is not critical, however, the thickness may range from 25 micrometers to 300 micrometers. The substrate is preferably transparent, alternatively, substrates which are not transparent may be used provided that they allow the silicone hybrid pressure sensitive adhesive to be exposed to UV radiation.

To improve bonding of the silicone hybrid pressure sensitive adhesive to the substrate, the method may optionally further comprise treating the surface of the substrate before applying the silicone hybrid pressure sensitive adhesive composition. Treating the substrate may be performed by any convenient means, such as applying a primer, or subjecting the substrate to corona-discharge treatment, etching, or plasma treatment before applying the silicone hybrid pressure sensitive adhesive composition to the substrate.

An adhesive article, such as a protective film, may be prepared by applying the silicone hybrid pressure sensitive adhesive composition described above onto the surface of the substrate described above. The method may optionally further comprise removing the all, or a portion, of the solvent (when present) before and/or during curing. Removing solvent may be performed by any convenient means, such as heating at a temperature that vaporizes the solvent without fully curing the silicone hybrid pressure sensitive adhesive composition via hydrosilylation reaction, e.g., heating at a temperature of 70° C. to 120° C., alternatively 50° C. to 100° C., and alternatively 70° C. to 80° C. for a time sufficient to remove all or a portion of the solvent (e.g., 30 seconds to 1 hour, alternatively 1 minute to 5 minutes). The method then further comprises curing the silicone hybrid pressure sensitive adhesive composition (which may have some or all of the solvent removed when the drying step is performed) via hydrosilylation reaction at room temperature or by heating at a temperature of 60° C. to 220° C., alternatively 70° C. to 170° C., and alternatively 80° C. to 160° C., for a time sufficient to form the silicone hybrid pressure sensitive adhesive on the surface of the substrate (e.g., for 30 seconds to an hour, alternatively 15 to 45 minutes). Drying and/or hydrosilylation reaction curing may be performed by placing the substrate in an oven. The amount of the silicone hybrid pressure sensitive adhesive composition to be applied to the substrate depends on the specific application, however, the amount may be sufficient such that after curing thickness of the silicone hybrid pressure sensitive adhesive may be 50 micrometers to 1,000 micrometers, alternatively 100 micrometers to 700 micrometers, and alternatively 200 micrometers to 600 micrometers; after cure via hydrosilylation reaction.

Therefore, the method for forming the adhesive article comprising a silicone hybrid pressure sensitive adhesive layer on a surface of a substrate comprises:
 optionally 1) treating the surface of the substrate as described above;
 2) applying the silicone hybrid pressure sensitive adhesive composition described above to the surface of the substrate, and
 optionally 3) removing all or a portion of the solvent, if present,
 4) heating the silicone hybrid pressure sensitive adhesive composition to form the silicone hybrid pressure sensitive adhesive layer on the surface of the substrate.

The method steps 2) to 4) described above may be repeated one or more times to increase thickness of the silicone hybrid pressure sensitive adhesive, if desirable. (The desirable thickness is described below, in Methods of Use). The method described above may optionally further comprise applying a removable release liner to the silicone hybrid pressure sensitive adhesive layer opposite the substrate, e.g., to protect the silicone hybrid pressure sensitive adhesive before use. The release liner may be removed before use of the adhesive article. The obtained silicone hybrid pressure sensitive layer of the cured film above contains a free (meth)acryl group, which can be analyzed by Fourier Transform-Infrared (FT-IR) spectroscopy, and its relative amount of the cured film and its reaction when exposed to UV irradiation could be monitored by the absorption intensity of unsaturated bond's vibration in FT-IR spectrum as illustrated in 'UV coatings: basics, recent developments and new applications', at page 33 (Elsevier; 2006 Dec. 21) to Schwalm; Polymer Chemistry. 2013; 4(8):2449-56 to Espeel. The free (meth)acryl group in the prepared silicone hybrid sensitive adhesive by using starting material (A) was detected at around 1296 cm$^{-1}$ and 938 cm$^{1}$.

Methods of Use

The adhesive article described above may be used in a method comprising:
 5) applying the adhesive article (prepared as described above) to an uneven surface such that a surface of the silicone hybrid pressure sensitive adhesive layer opposite the substrate contacts the uneven surface,
 optionally 6) applying heat and/or pressure to the adhesive article and the uneven surface, and
 7) exposing the silicone hybrid pressure sensitive adhesive layer to UV radiation;

thereby conforming the silicone hybrid pressure sensitive adhesive layer to the uneven surface. The uneven surface may be any portion of an (opto)electronic device having features thereon, such as all, or a portion of, a ball grid array or a land grid array.

The uneven surface may have a line-shaped, a round (circle)-shaped, or a rectangular-shaped pattern, and its pattern can be concave or convex. The width of a line, the diameter of a round circle, and the one side of a rectangular can be 0.1 mm to 10 mm. The height of the thickness unevenness applied on the member is not particularly limited but may range from 1 um to 600 um or less. Moreover, from the viewpoint of the effect of thin film formation and recovery of the thickness unevenness, the ratio of thickness of the silicone hybrid pressure sensitive adhesive layer to the height of the thickness unevenness (thickness of silicone hybrid pressure sensitive adhesive layer/height of thickness unevenness) may be 1.1 to 5, alternatively 1.5 to 4. Particular examples of lamination on uneven surface in an industrial field were described in U.S. Pat. No. 8,920,592, U.S. patent application Ser. No. 13/722,276 (Optical devices); U.S. Pat. No. 6,906,425 to Stewart, U.S. Pat. No. 6,000,603, Patent Application WO2015182816 (electronic devices), U.S. patent application Ser. No. 16/244,860 (US20190148598, Micro assembled optical devices). The silicone hybrid pressure sensitive adhesive composition and methods for its preparation and use may be used in place of the adhesives in these references.

The temperature at which the adhesive article tends to sufficiently conform to a 3-D feature of the uneven surface, can be RT to 200° C. When pressure is applied to the adhesive article to conform it to the uneven surface, the pressure applied can be generally 0.05 MPa or more, alternatively 0.1 MPa or more, and 2 MPa or less, alternatively 1 MPa or less. To remove voids completely (to obtain bubble free laminates), vacuum may be applied during lamination upon complexity of 3-D feature of uneven surface, generally 25 torr or less, alternatively 5 torr or less.

The ultraviolet irradiation in step 7) can be performed using a general ultraviolet irradiation apparatus, for example, a face type or a conveyer belt-type ultraviolet irradiation apparatus, where a low-pressure mercury lamp, a medium-pressure mercury lamp, a high-pressure mercury lamp, an ultrahigh-pressure mercury lamp, a xenon lamp, a metal halide lamp, an electrodeless lamp, an ultraviolet light-emitting diodes or the like is used as the light source. The ultraviolet irradiation dose is generally from 0.1 to 5 W/cm$^2$ for 5 to 120 seconds (=0.5 to 600 J/cm$^2$).

EXAMPLES

These examples are intended to illustrate some embodiments of the invention and should not be interpreted as limiting the scope of the invention set forth in the claims. Starting materials used in these examples are described in Table 1.

TABLE 1

Starting Materials Used in the Examples

| Starting Material | Chemical Description | Source |
|---|---|---|
| DOWSIL ™ Z-6033 | 3-methacryloxypropylmethyldimethoxysilane (CAS#14513-34-9) | Dow Silicones |
| OH Fluid | bis-hydroxy-terminated polydimethylsiloxane with DP of ~30 (CAS#70131-67-8) | Dow Silicones |

TABLE 1-continued

Starting Materials Used in the Examples

| Starting Material | Chemical Description | Source |
|---|---|---|
| ME2/MeVi Diol | bis-hydroxy-terminated poly(dimethyl, methylvinyl)siloxane with DP of ~10 (CAS#67923-19-7) | Dow Silicones |
| End-blocker | bis-dimethylvinylsiloxy-terminated polydimethylsiloxane (CAS#68083-19-2) | Dow Silicones |
| Phosphazene Catalyst | partially hydrolysed dichlorophosphazene oligomer (CAS# 1391992-23-6) | Dow Silicones |
| Triflic Acid | Trifluoromethanesulfonic acid (CAS#1493-13-6) | TCI |
| DVTMDZ | 1,3-Divinyl-1,1,3,3-tetramethyldisilazane (CAS# 7691-02-3) | Sigma-Aldrich |
| HMDZ | Bis(trimethylsilyl)amine (CAS#999-97-3) | Dow Silicones |
| A-1 | 75% of Bis-vinyldimethylsiloxy--terminated (methacryloxypropyl)methylsiloxane - dimethylsiloxane copolymer in toluene, DP = 2815, (m + o)/n Ratio = 20/1 [Ma Content = 0.604 mmol/g, Vi Content = 0.009 mmol/g, Total Reactive group = 0.613 mmol/g in solid] | See Reference Example 4 for Synthesis |
| A-2 | 75% of Bis-vinyldimethylsiloxy-terminated (methacryloxypropyl)methylsiloxane - dimethylsiloxane copolymer in toluene, DP = 2188, (m + o)/n Ratio = 37/1 [Ma Content = 0.343 mmol/g, Vi Content = 0.012, Total reactive group = 0.355 in solid] | See Reference Example 1 for Synthesis |
| A-3 | 75% of Bis-vinyldimethylsiloxy -terminated (methacryloxypropyl)methylsiloxane - dimethylsiloxane copolymer in toluene, DP = 5710, (m + o) Ratio = 56/1 [Ma Content = 0.230 mmol/g, Vi Content = 0.005 mmol/g, Total Reactive group = 0.235 mmol/g in solid] | See Reference Example 2 for Synthesis |
| A-4 | 75% of Bis-vinyldimethylsiloxy-terminated (methacryloxypropyl)methylsiloxane - dimethylsiloxane copolymer in toluene, DP = 2689, (m + o) Ratio = 260/1 [Ma Content = 0.051 mmol/g, Vi Content = 0.010 mmol/g, Total Reactive group = 0.061 mmol/g in solid] | See Reference Example 3 for Synthesis |
| A-5 | 75% of Bis-vinyldimethylsiloxy-terminated (methacryloxypropyl)methylsiloxane - dimethylsiloxane copolymer in toluene, DP = 2560, (m + o) Ratio = 35/1 [Ma Content = 0.026 mmol/g, Vi Content = 0.010 mmol/g, Total Reactive group = 0.037 mmol/g in solid] | See Reference Example 5 for Synthesis |
| A-6 | Bis-vinyldimethylsiloxy-terminated (methacryloxypropyl)methylsiloxane - dimethylsiloxane copolymer, DP = 288, (m + o)/n Ratio = 35/1 [Methacryl Content = 0.355 mmol/g, Vi Content = 0.089 mmol/g, Total Reactive group = 0.443 mmol/g] | See Reference Example 6 for Synthesis |
| A-7 | Bis-trimethylsiloxy-terminated (methacryloxypropyl)methylsiloxane - dimethylsiloxane - vinylmethylsiloxane copolymer, DP = 288, (m + o)/n Ratio = 31/1 [Methacryl Content = 0.339 mmol/g, Vi Content = 0.106 mmol/g, Total Reactive group = 0.505 mmol/gl | See Reference Example 7 for Synthesis |
| A'-8 | Bis-vinyl-terminated polydimethylsiloxane, DP = 766, [Vi content = 0.033 mmol/g] | Dow Silicones DOWSIL™ 7646 Adhesive |
| A'-9 | 30% of Bis-vinyl-terminated polydimethylsiloxane in toluene, DP = 9,461, [Vi content = 0.004 mmol/g in solid] | Dow Silicones DOWSIL™ 7637 Adhesive |
| B-1 | 68% of Methacryloxypropyl(methyl)ated, Dimethylvinylated and trimethylated silica in xylene and toluene: $(Me_3SiO_{1/2})_{0.40}(ViMe_2SiO_{1/2})_{0.039}(MaMeSiO_{2/2})_{0.024}(SiO_{4/2})_{0.537}(OH)_{0.01}$ [Methacryl Content = 0.332 mmol/g, Vi Content = 0.532 mmol/g, Total Reactive group = 0.864 mmol/g] | See Reference Example 6 for Synthesis |
| B-2 | 75% of Silicic acid, sodium salt, reaction products with chlorotrimethylsilane and iso-Pr alcohol in xylene (CAS# 68988-56-7) | Dow Silicones |
| B-3 | 75% of Dimethylvinylated and trimethylated silica in xylene (CAS#68988-89-6): [Vi content = 0.703 mmol/g, Total Reactive Group = 0.703 mmol/g] | Dow Silicones DOWSIL™ 6-3444 Int |
| B-4 | 68.2% of Methacryloxypropyl(methyl)ated and trimethylated silica: $(Me_3SiO_{1/2})_{0.476}(MaMeSiO_{2/2})_{0.048}(SiO_{4/2})_{0.476}$ [Methacryl Content = 0.626 mmol/g, , Total Reactive group = 0.626 mmol/g] | See Reference Example 8 for Synthesis |

TABLE 1-continued

Starting Materials Used in the Examples

| Starting Material | Chemical Description | Source |
|---|---|---|
| C-1 | Poly(methylhydrosiloxane), trimethylsilyl terminated, SiH of $D^H$ = 15.97 mmol/g, 20 cst (CAS#63148-57-2) | Dow Silicones DOWSIL ™ 7028 Crosslinker |
| C-2 | Methylhdyrosiloxane-dimethylsiloxane copolymer, hydride terminated, SiH of = 4.32 mmol/g, $D^H$ = 3.26 mmol/g, $M^H$ = 1.06 mmol/g, 13 cst (CAS#69013-23-6) | Dow Silicones |
| D-1 | Platinum catalyst (4% Active Pt); Platinum, 1,3-diethenyl-1,1,3,3-tetramethyldisiloxane complexes (CAS# 68478-92-2) | Dow Silicones |
| D-2 | Platinum catalyst (0.75% Active Pt) | Dow Silicones DOWSIL ™ NC-25 |
| E-1 IRGACURE ™ 184 | 1-Hydroxycyclohexyl phenyl ketone CAS# 947-19-3 | BASF |
| F-1 ETCH | 1-Ethynyl-1-cyclohexanol CAS# 78-27-3 | Dow Silicones |
| G-1 MEHQ | 4-Methoxyphenol CAS# 150-76-5 | Sigma-Aldrich |
| H-1 | Toluene | Sigma-Aldrich |
| I-1 | N-phenyl glycine (CAS#103-01-5) | TCI |
| I-2 | ethyl 4-(dimethylamino)benzoate (CAS# 10287-53-3) | TCI |
| I-3 | Mercaptosiloxane | Dow Silicones |
| J-1 | Fumed Silica, DM-30 | Tokuyama |

Starting materials branded DOWSIL™ are commercially available from Dow Silicones Corporation and/or its subsidiaries.

In this Reference Example 1, a bis-vinyl-terminated poly(dimethyl/methyl,methacryloxypropyl)siloxane copolymer shown as Starting Material A-1 in Table 1, above, was synthesized as follows. To a 4-neck 1 liter round bottom flask 3-methacryloxypropyl methyl dimethoxysilane (120.00 g, DOWSIL™ Z-6033) and 0.1N HCl (128.87 g) were added and mixed using a magnetic stir bar at ~23° C. Using a simple distillation glassware setup vacuum was pulled to ~20 mmHg for 1.5 hours. After 1.5 hours the vacuum was released and bis-hydroxy-terminated polydimethylsiloxane (786.50 g, OH Fluid) along with 0.23 g of (G-1) MEHQ were added to the reaction solution. The magnetic stir bar was removed and a Teflon paddle with a glass stir rod was used to mix the solution. Vacuum was pulled to ~5 mmHg and the reaction was heated to 80° C. for 1.5 hours. The simple distillation glassware setup was dissembled, and a Dean Stark distillation setup was used for the last reaction step. To the reaction solution, (H-1) toluene (380 g, Sigma-Aldrich) and bis-dimethylvinylsiloxy-terminated polydimethylsiloxane (2.87 g, End-blocker) were added. The solution was then heated to 111-115° C., with 0.3 mL of phosphazene catalyst being added at 90° C. The overheads were collected in the Dean Stark trap and an additional 0.3 mL of phosphazene catalyst was added. The solution was held at toluene reflux for 1 hour. The heat was removed, and the solution was cooled. At ~60° C., trihexylamine (0.3 g, Sigma Aldrich) was added to the reaction solution and mixed for 2 hours. And, the solution was heated to 120° C. with nitrogen/2% oxygen gas bubbling for 1 hours and cooled to RT. The solid content of the solution was adjusted to 75% by adding additional toluene. Then, the product dissolved in toluene was obtained. Based on $^{13}$C- and $^{29}$Si-NMR analysis, the obtained bis-vinyldimethylsiloxy-terminated poly(dimethyl/methyl,methacryloxypropyl) siloxane copolymer comprised the following unit formula: $(R^4{}_3SiO_{1/2})_{0.00071}(R^4{}_2SiO_{2/2})_{0.99929}$; where each $R^4$ was independently selected from methyl, methacryloxypropyl, and vinyl; and the subscripts represent mole fractions. The methacryl content was 2.406 mole % of total $R^4$, the vinyl content was 0.012 mole % of total $R^4$, and the methyl content was 97.582 mole % of total $R^4$. The (m+o)/n ratio is 20/1. [Methacryl Content=0.604 mmol/g, Vi Content=0.009 mmol/g, Total Reactive group=0.613 mmol/g]. The obtained bis-vinyldimethylsiloxy-terminated poly(dimethyl/methyl, methacryloxypropyl)siloxane copolymer can also be expressed as unit formula: $(ViMe_2SiO)_2(MaMeSiO)_{136}(Me_2SiO)_{2679}$.

In this Reference Example 2, a bis-vinyl-terminated poly(dimethyl/methyl,methacryloxypropyl)siloxane copolymer shown as Starting Material A-2 in Table 1, above, was synthesized as follows. To a 4-neck 1 liter round bottom flask 3-methacryloxypropyl methyl dimethoxysilane (50.78 g, DOWSIL™ Z-6033) and 0.1 N HCl (45.45 g) were added and mixed using a magnetic stir bar at ~23° C. Using a simple distillation glassware setup vacuum was pulled to ~20 mmHg for 1.5 hours. After 1.5 hours the vacuum was released and bis-hydroxyl-terminated polydimethylsiloxane (550.00 g, OH FLUID) along with 0.16 g of (G-1) MEHQ were added to the reaction solution. The magnetic stir bar was removed and a Teflon paddle with a glass stir rod was used to mix the solution. Vacuum was pulled to ~5 mmHg and the reaction was heated to 80° C. for 1.5 hours. The simple distillation glassware setup was dissembled, and a Dean Stark distillation setup was used for the last reaction step. To the reaction solution, (H-1) toluene (300 g, Sigma-Aldrich) and bis-dimethylvinylsiloxy-terminated polydimethylsiloxane (2 g, End-blocker) were added. The solution was then heated to 111-115° C., with 0.4 mL of phosphazene catalyst being added at 90° C. The overheads were collected in the Dean Stark trap and an additional 0.4 mL of phosphazene catalyst was added. The solution was held at toluene reflux for 1 hour. The heat was removed, and the solution was cooled. At ~60° C., DVTMDZ (1 g, Sigma Aldrich) was added to the reaction solution and mixed for 2 hours. And, the solution was heated to 120° C. with nitrogen/2% oxygen gas bubbling for 1 hours and cooled to RT with gas bubbling. The solid content of the solution (which was measured the weight before and after drying 150° C. for 1 hour) was adjusted to 75% by adding additional toluene. Then, the product dissolved in toluene was obtained. Based on $^{13}$C- and $^{29}$Si-NMR analysis, the obtained bis-dimethylvinylsiloxy-terminated poly(dimethyl/methyl,methacryloxypropyl) siloxane copolymer comprised the following average unit formula: $(R^4_3 SiO_{1/2})_{0.00091}(R^4_2 SiO_{2/2})_{0.99909}$; where each $R^4$ was independently selected from methyl, methacryloxypropyl, and vinyl; and the subscripts represented mole fractions. The methacryl content was 1.325 mole % of total $R^4$, the vinyl content was 0.015 mole % of total $R^4$, and the methyl content was 98.660 mole % of total $R^4$. The (m+o)/n ratio is 37/1. [Methacryl Content=0.343 mmol/g, Vi Content=0.012, total reactive group=0.355]. Alternatively, the obtained bis-dimethylvinylsiloxy-terminated poly(dimethyl/methyl,methacryloxypropyl)siloxane copolymer could be shown with the average unit formula $(ViMe_2SiO)_2(MaMeSiO)_{58}(Me_2SiO)_{2130}$.

In this Reference Example 3, a bis-vinyldimethylsiloxy-terminated poly(dimethyl/methyl,methacryloxypropyl)siloxane copolymer shown as Starting Material A-3 in Table 1, above, was synthesized as follows. To a 4-neck 1 liter round bottom flask 3-methacryloxypropyl methyl dimethoxysilane (33.3 g, DOWSIL™ Z-6033) and 0.1 N HCl (45.45 g) were added and mixed using a magnetic stir bar at room temperature (~23° C.). Using a simple distillation glassware setup vacuum was pulled to ~20 mmHg for 1.5 hours. After 1.5 hours the vacuum was released and dimethyl siloxane, silanol terminated (600.00 g, OH FLUID) along with 0.23 g of (G-1) MEHQ were added to the reaction solution. The magnetic stir bar was removed and a Teflon paddle with a glass stir rod was used to mix the solution. Vacuum was pulled to ~5 mmHg and the reaction was heated to 80° C. for 1.5 hours. The simple distillation glassware setup was dissembled, and a Dean Stark distillation setup was used for the last reaction step. To the reaction solution, (H-1) toluene (300 g, Sigma-Aldrich) and bis-dimethylvinylsiloxy-terminated polydimethylsiloxane (2.2 g, End-blocker) were added. The solution was then heated to 111-115° C., with 0.4 mL of phosphazene catalyst being added at 90° C. The overheads were collected in the Dean Stark trap and an additional 0.4 mL of phosphazene catalyst was added. The solution was held at toluene reflux for 1 hour. The heat was removed, and the solution was cooled. At ~60° C., DVTMDZ (1 g, Sigma Aldrich) was added to the reaction solution and mixed for 2 hours. And, the solution was heated to 120° C. with nitrogen/2% oxygen gas bubbling for 1 hours and cooled to RT with gas bubbling. The solid content of the solution was adjusted to 75% by adding additional toluene. Then, the product dissolved in toluene was obtained. Based on $^{13}$C- and $^{29}$Si-NMR analysis, the obtained bis-vinyldimethylsiloxy-terminated poly(dimethyl/methyl,methacryloxypropyl)siloxane copolymer comprised the following average unit formula: $(R^4_3 SiO_{1/2})_{0.00035}(R^4_2 SiO_{2/2})_{0.99965}$; where each $R^4$ was independently selected from methyl, methacryloxypropyl, and vinyl; and the subscripts represent mole fractions. The methacryl content was 0.876 mole % of total $R^4$, the vinyl content was 0.006 mole % of total $R^4$, and the methyl content was 99.1187 mole % of total $R^4$. The (m+o)/n ratio is 56/1. [Methacryl Content=0.230 mmol/g, Vi Content=0.005 mmol/g, Total Reactive group=0.235 mmol/g]. Alternatively, the obtained a bis-vinyldimethylsiloxy-terminated poly(dimethyl/methyl,methacryloxypropyl)siloxane copolymer could be shown as: $(ViMe_2SiO)_2(MaMeSiO)_{100}(Me_2SiO)_{5610}$.

In this Reference Example 4, a bis-vinyl-terminated poly(dimethyl/methyl,methacryloxypropyl)siloxane copolymer shown as Starting Material A-4 in Table 1, above, was synthesized as follows. To a 4-neck 1 liter round bottom flask 3-methacryloxypropyl methyl dimethoxysilane (13.7 g, DOWSIL™ Z-6033) and 0.1N HCl (24.37 g) were added and mixed using a magnetic stir bar at ~23° C. Using a simple distillation glassware setup vacuum was pulled to ~20 mmHg for 1.5 hours. After 1.5 hours the vacuum was released and bis-hydroxyl-terminated polydimethylsiloxane (1179.49 g, OH FLUID) along with 0.34 g of (G-1) MEHQ were added to the reaction solution. The magnetic stir bar was removed and a Teflon paddle with a glass stir rod was used to mix the solution. Vacuum was pulled to ~5 mmHg and the reaction was heated to 80° C. for 1.5 hours. The simple distillation glassware setup was dissembled, and a Dean Stark distillation setup was used for the last reaction step. To the reaction solution, (H-1) toluene (550 g, Sigma-Aldrich) and bis-dimethylvinylsiloxy-terminated polydimethylsiloxane (2.2 g, End-blocker) were added. The solution was then heated to 111-115° C., with 0.1 mL of phosphazene catalyst being added at 90° C. The overheads were collected in the Dean Stark trap and an additional 0.1 mL of phosphazene catalyst was added. The solution was held at toluene reflux for 1 hour. The heat was removed, and the solution was cooled. At ~60° C., DVTMDZ (0.3 g, Sigma Aldrich) was added to the reaction solution and mixed for 2 hours. And, the solution was heated to 120° C. with nitrogen/2% oxygen gas bubbling for 1 hour and cooled to RT. The solid content of the solution was adjusted to 75% by adding additional toluene. Then, the product dissolved in toluene was obtained. Based on $^{13}$C- and $^{29}$Si-NMR analysis, the obtained bis-vinyldimethylsiloxy-terminated poly(dimethyl/methyl,methacryloxypropyl)siloxane copolymer comprised the following average unit formula: $(R^4_3 SiO_{1/2})_{0.00074}(R^4_2 SiO_{2/2})_{0.99926}$; where each $R^4$ was independently selected from methyl, methacryloxypropyl, and vinyl; and the subscripts represented mole fractions. The methacryl content was 0.192 mole % of total $R^4$, the vinyl content was 0.012 mole % of total $R^4$, and the methyl content was 99.796 mole % of total $R^4$. The (m+o)/n ratio is 260/1. [Methacryl Content=0.051 mmol/g, Vi Content=0.010 mmol/g, Total Reactive group=0.061 mmol/g]. Alternatively, the obtained bis-vinyldimethylsiloxy-terminated poly(dimethyl/methyl, methacryloxypropyl)siloxane copolymer could be shown as $(ViMe_2SiO)_2ViMe_2SiO(MaMeSiO)_{10}(Me_2SiO)_{2679}$.

In this Reference Example 5, a bis-vinyldimethylsiloxy-terminated poly(dimethyl/methyl,methacryloxypropyl)siloxane copolymer shown as Starting Material A-5 in Table 1, above, was synthesized as follows. To a 4-neck 1 liter round bottom flask 3-methacryloxypropyl methyl dimethoxysilane (4.5 g, DOWSIL™ Z-6033) and 0.1 N HCl (4.55 g) were added and mixed using a magnetic stir bar at room temperature (~23° C.). Using a simple distillation glassware setup vacuum was pulled to ~20 mmHg for 1.5 hours. After 1.5 hours the vacuum was released and dimethyl siloxane, silanol terminated (786.5 g, OH FLUID) along with 0.23 g of (G-1) MEHQ were added to the reaction solution. The magnetic stir bar was removed and a Teflon paddle with a glass stir rod was used to mix the solution. Vacuum was pulled to ~5 mmHg and the reaction was heated to 80° C. for 1.5 hours. The simple distillation glassware setup was dissembled, and a Dean Stark distillation setup was used for the last reaction step. To the reaction solution, (H-1) toluene (450 g, Sigma-Aldrich) and bis-dimethylvinylsiloxy-terminated polydimethylsiloxane (5 g, End-blocker) were added. The solution was then heated to 111-115° C., with 0.1 mL of phosphazene catalyst being added at 90° C. The overheads were collected in the Dean Stark trap and an additional 0.1 mL of phosphazene catalyst was added. The solution was held at toluene reflux for 1 hour. There was ~80 g of overheads collected. The heat was removed, and the solution was cooled. At ~60° C., DVTMDZ (0.3 g, Sigma Aldrich) was added to the reaction solution and mixed for 2 hours. The solid content of the solution was adjusted to 75% by adding additional toluene. Then, the product dissolved in toluene was obtained. Based on $^{13}$C- and $^{29}$Si-NMR analysis, the obtained bis-vinyldimethylsiloxy-terminated poly(dimethyl/methyl,methacryloxypropyl)siloxane copolymer comprised the following average unit formula: $(R^4_3 SiO_{1/2})_{0.00074}(R^4_2 SiO_{2/2})_{0.99926}$, where each $R^4$ was independently selected from methyl, methacryloxypropyl, and vinyl, and the subscripts represented mole fractions. The methacryl content was 0.097 mole % of total $R^4$, the vinyl content was 0.022 mole % of total $R^4$, and the methyl content was 99.881 mole % of total $R^4$. The (m+o)/n ratio is 512/1. [Methacryl Content=0.025 mmol/g, Vi Content=0.017 mmol/g, Total Reactive group=0.043 mmol/g] The obtained bis-vinyldimethylsiloxy-terminated poly(dimethyl/methyl,methacryloxypropyl)siloxane copolymer can also be expressed as unit formula: $(ViMe_2SiO)_2(MaMeSiO)_3(Me_2SiO)_{1536}$.

In this Reference Example 6, a bis-vinyldimethylsiloxy-terminated poly(dimethyl/methyl,methacryloxypropyl)siloxane copolymer shown as Starting Material A-6 in Table 1, above, was synthesized as follows. 900 g of dimethyl siloxane, silanol terminated (786.5 g, OH FLUID), 63 g of 3-methacryloxypropylmethyldimethoxysilane (DOWSIL™ Z-6033), 6.3 of hexamethyldisiloxane, and 180 g of heptane were charged into a 4-neck 2 L flask equipped with a thermal couple, a mechanical stirrer, a Dean Stark adapted to water cooled condenser and air bubbler. With vigorous stirring, 0.53 ml triflic acid (Sigma-Aldrich) was added into the flask. Heat was applied, and the pot temperature rose to 73° C. Water, methanol, and heptane began' to distill out and collected in the Dean Stark. The refluxing temperature gradually rose to 90° C. after ~1 hour. 3 g of water was added into the flask and continue the azeotropic distillation process. 30 minutes later, the pot temperature rose to ~90° C. and another 2.5 g of water was added into the flask. The refluxing temperature rose to 96° C. after 1 hour and 40 minutes. During the above process, water/methanol collected in the Dean Stark was drained out. Heat source was removed and 36 g of Kyowaad™ 500SN (Kytowa Chemical Industry Co, Ltd) were added into the flask. The pot temperature was cooled down to RT. Solids were filtered out through a 0.45 μm filter membrane after stirred for 3 hours. The filtrate was rotovaped at 110° C. and <1 torr for 1 hour. Then, the product was obtained. Based on $^{13}$C- and $^{29}$Si-NMR analysis, the obtained bis-vinyldimethylsiloxy-terminated poly(dimethyl/methyl,methacryloxypropyl)siloxane copolymer comprised the following average unit formula: $(R^4_3 SiO_{1/2})_{0.00689}(R^4_2 SiO_{2/2})_{0.99311}$, where each $R^4$ was independently selected from methyl, methacryloxypropyl, and vinyl, and the subscripts represented mole fractions. The methacryl content was 1.383 mole % of total $R^4$, the vinyl content was 0.115 mole % of total $R^4$, and the methyl content was 98.502 mole % of total $R^4$. The (m+o)/n ratio is 35/1. [Methacryl Content=0.355 mmol/g, Vi Content=0.089 mmol/g, Total Reactive group=0.443 mmol/g] The obtained bis-vinyldimethylsiloxy-terminated poly(dimethyl/methyl, methacryloxypropyl)siloxane copolymer can also be expressed as unit formula: $(ViMe_2SiO)_2(MaMeSiO)_8 (Me_2SiO)_{280}$.

In this Reference Example 7, a bis-vinyldimethylsiloxy-terminated poly(dimethyl/methyl,methacryloxypropyl)siloxane copolymer shown as Starting Material A-7 in Table 1, above, was synthesized as follows. To a 4-neck 1 liter round bottom flask 3-methacryloxypropyl methyl dimethoxysilane (30 g, DOWSIL™ Z-6033), dimethyl, methylvinyl siloxane, silanol terminated (9.5 g, ME2/MeVi Diol) and 0.1 N HCl (4.55 g) were added and mixed using a magnetic stir bar at room temperature (~23° C.). Using a simple distillation glassware setup vacuum was pulled to ~20 mmHg for 1.5 hours. After 1.5 hours the vacuum was released and dimethyl siloxane, silanol terminated (300 g, OH FLUID) along with 0.03 g of (G-1) MEHQ were added to the reaction solution. The magnetic stir bar was removed and a Teflon paddle with a glass stir rod was used to mix the solution. Vacuum was pulled to ~5 mmHg and the reaction was heated to 80° C. for 1.5 hours. The simple distillation glassware setup was dissembled, and a Dean Stark distillation setup was used for the last reaction step. To the reaction solution, (H-1) toluene (200 g, Sigma-Aldrich). The solution was then heated to 111-115° C., with 0.1 mL of phosphazene catalyst being added at 90° C. The overheads were collected in the Dean Stark trap and an additional 0.1 mL of phosphazene catalyst was added. The solution was held at toluene reflux for 1 hour. There was ~80 g of overheads collected. The heat was removed, and the solution was cooled. At <50° C., HMDZ (1.31 g, Sigma Aldrich) was added to the reaction solution and mixed for 1 hours. Water was added and mixed for 30 min. and then the temperature was elevated to 110° C. to remove water, volaille residuals and ammonia gas for 1 hours. The solid content of the solution was adjusted to 40%. Then, the product dissolved in toluene was obtained. Based on 13C- and $^{29}$Si-NMR analysis, the obtained bis-trimethylsiloxy-terminated poly(dimethyl/methyl,vinyl/methyl, methacryloxypropyl)siloxane copolymer comprised the following average unit formula: $(R^4_3 SiO_{1/2})_{0.00004}(R^4_2 SiO_{2/2})_{0.99916}$, where each $R^4$ was independently selected from methyl, methacryloxypropyl, and vinyl, and the subscripts represented mole fractions. The methacryl content was 1.55 mole % of total $R^4$, the vinyl content was 0.4 mole % of total $R^4$, and the methyl content was 98.05 mole % of total $R^4$. The (m+o)/n ratio is 31/1. [Methacryl Content=0.339 mmol/g, Vi Content=0.106 mmol/g, Total Reactive group=0.505 mmol/g] The obtained bis-vinyldimethylsiloxy-terminated poly(dimethyl/methyl,vinyl/methyl, methacryloxypropyl)siloxane copolymer can also be expressed as unit formula: $(Me_3SiO)_2(MaMeSiO)_{155}(ViMeSiO)_{40}(Me_2SiO)_{4795}$.

In this Reference Example 8, a both methacryloxy and vinyl-functional polyorganosilicate resin shown as Starting Material B-1 in Table 4, was synthesized as follow. The following starting materials were charged into a 3-neck 2 L flask equipped with a thermal couple, a mechanical stirrer, a Dean Stark adapted to water cooled condenser and $N_2$ bubbler: 742.2 g of 75% of (B-3) dimethylvinylated and trimethylated silica (Mn=4830, Mw=5030) in xylene, 39.5 g of 3-methacryloxypropylmethyldimethoxysilane, 0.20 g of 4-methoxyphenol, and 120 g of toluene. With vigorous stirring, 1.2 g of trifluoromethane sulfonic acid (from Sigma-Aldrich) was slowly added, and heated to 60° C.

After 1 hours. 9.18 g of water was added and stirred for 2 hours. The refluxing temperature gradually rose to 90° C. after 1 hour to collect methanol. The refluxing temperature gradually rose to 127° C. During the above process, water/methanol collected in the Dean Stark was drained out. After no water was distilled out, the flask contents were additionally refluxed for 2 hours with maintaining the temperature. Thereafter, the heat source was removed, and 22.8 g of calcium carbonate (from Sigma-Aldrich) and 50 g of sodium sulfate (from Sigma-Aldrich) were added into the flask. The flask was cooled down to RT. Solids were filtered out through a 0.45 μm filter membrane after stirring for 3 hours. The resulting methacryloxy-functional polyorganosilicate resin was a liquid in solvent (xylene and toluene) (Solid contents=68.4%). The methacryloxy-functional polyorganosilicate resin was represented by the following average formula: $(Me_3SiO_{1/2})_{0.40}(ViMe_2SiO_{1/2})_{0.039}(MaMeSiO_{2/2})_{0.024}(SiO_{4/2})_{0.537}(OH)_{0.01}$, with Methacryl Content=1.79 mol % of total $R^4$; Vinyl Content=2.86 mol % of total $R^4$; Methyl content=95.36 mole % of total $R^4$ [Methacryl Content=0.332 mmol/g, Vi Content=0.532 mmol/g, Total Reactive group=0.864 mmol/g]

In this Reference Example 9, a methacryloxy-functional polyorganosilicate resin shown as Starting Material B-4 in Table 4, was synthesized as follow. The following starting materials were charged into a 3-neck 2 L flask equipped with a thermal couple, a mechanical stirrer, a Dean Stark adapted to water cooled condenser and $N_2$ bubbler: 450.37 g of 75% of (B-2) trimethylated silica (Mn=3065, Mw=5664) in xylene, 55.76 g of 3-methacryloxypropylmethyldimethoxysilane, 0.13 g of (G-1) MEHQ, and 120 g of toluene. With vigorous stirring, 0.6 g of triflic acid (Sigma-Aldrich) was slowly added, and heated to 60° C. After 1 hours. 9 g of water was added and stirred for 1 hours at RT. Then, 60 g of methanol and 1.73 g of 11 N KOH were added subsequently. The temperature gradually rose to 90° C. after 1 hour to collect methanol. The refluxing temperature gradually rose to 115° C. During the above process, water/methanol collected in the Dean Stark was drained out. After no water was distilled out, the flask contents were additionally refluxed for 1 hours with maintaining the temperature. Thereafter, the heat source was removed, and 0.94 g of acetic acid (Sigma-Aldrich) were added into the flask. The flask was cooled down to RT. Solids were filtered out through a 0.45 μm filter membrane after stirring for 3 hours. The resulting methacryloxy-functional polyorganosilicate resin was a liquid in solvent (xylene and toluene) (Solid contents=68.2%). The methacryloxy-functional polyorganosilicate resin was represented by the following average formula: $(Me_3SiO_{1/2})_{0.476}(MaMeSiO_{2/2})_{0.048}(SiO_{4/2})0.476$, with Methacryl Content=3.13 mol % of total $R^4$; Methyl content=96.88 mole % of total $R^4$ [Methacryl Content=0.626 mmol/g, Total Reactive group=0.626 mmol/g]

In this Reference Example 10, silicone hybrid pressure sensitive adhesive compositions and comparative compositions were made. Starting material (A) and (B) may be dissolved in solvents. The general procedure was as follows: For preparing the sample labelled Inv. 1, a solution was prepared by mixing the following starting materials in a mixer: 133.33 g of the 100 g of starting material (A-1) dissolved in toluene (H-1) with ~ 300 ppm of (G-1); 140 g of the 95.76 g of the staring material (B-3) dissolved in solvents; 10.8 g of polyorganohydrogensiloxane (C-2); 8.3 g of photoradical initiator (E-1); 0.2 g of hydrosilylation reaction inhibitor (F-1). After mixing of above starting materials, the obtained solution was further mixed with 0.3 g of hydrosilylation reaction catalyst (D-1). Mixing of the above starting materials with the aforementioned solution produced a silicone hybrid pressure sensitive adhesive composition. The obtained composition was used for manufacturing an adhesive tape. The produced adhesive tape was evaluated with regard to the lamination property and adhesive force. Comparative examples and Inv. 2-25 were prepared in the same manner using the starting materials and amounts in the tables. For preparing the solventless sample labelled Inv. 26, a solution was prepared by mixing the following starting materials in a mixer: 100 g of the starting material (A-6) with ~ 300 ppm of (G-1) and 458.21 g of the 312.5 g of the staring material (B-4), and xylene and toluene were evaporated under reduced pressure at 110° C. Then, 2.8 g of polyorganohydrogensiloxane (C-2); 6.2 g of photoradical initiator (E-1); 0.1 g of hydrosilylation reaction inhibitor (F-1) were added. After mixing of above starting materials, the obtained fluid was further mixed with 0.1 g of hydrosilylation reaction catalyst (D-1). Inv. 27-29 were prepared in the same manner using the starting materials and amounts in the tables. Tables 2-5 show the starting materials (described in detail in Table 1) and their amounts [based on solids in grams and (solution in grams)] used. The values (solution in grams) indicate that the starting material was first dissolved in solvent, and represents the weight in grams of the solution. The values based on solids indicate the amount of the starting material excluding solvent.

In this Reference Example 11, the silicone hybrid pressure sensitive adhesive compositions prepared according to Reference Example 9 were used to form silicone hybrid pressure sensitive adhesive tapes. Solvent-included composition (Comp.1-12, and Inv.1-25) was coated onto a polyethylene terephthalate (PET) film (50 μm), and then was dried by heating the coated film for 20 min at 110° C., followed by 4 min at 150° C. to have 200 μm. On the dried surface, each composition was coated repeatedly, and then was dried by heating the coated film for 20 min at 110° C., followed by 6 min at 150° C. The silicone hybrid pressure sensitive adhesive layer had a total thickness after curing is 400 μm. Solvent-less composition (Inv.26-29) was coated onto a polyethylene terephthalate (PET) film (50 μm), and then was dried by heating the coated film for 20 min at 110° C., followed by 5 min at 150° C. to have 400 μm. The obtained silicone hybrid pressure sensitive adhesive sheet was pasted onto a fluoro-coated polyethylene terephthalate film (release linear) by means of a laminator, and then the resulting product was aged for 1 day at room temperature.

In this Reference Example 11, the silicone hybrid pressure sensitive adhesive tapes prepared according to Reference Example 10 were evaluated for adhesion on an uneven surface. Then, the obtained silicone hybrid pressure sensitive adhesive sheet was cut into 1-inch wide tape strips, which were placed on an uneven surface. A ball grid array (or BGA Package) with a substrate size=27 mm×27 mm×2.46 mm, having 320-pin (ball) array on the surface; ball diameter=0.75 mm, ball height=0.35 mm, center pitch=1.27 mm, supplied from Fujitsu Semiconductor Limited, Product name: BGA-320P-$M_{06}$, was used as the uneven surface. The tape strips were bonded to the BGA packages using a laminator at the condition of RT for 30 minutes or 90° C. for 30 minutes. The pressure of 0.5 MPa was applied on the laminate under vacuum at <1 torr (Vacuum Laminator purchased from Shindo Eng. Lab. Ltd.). After pulling out the laminate from the chamber, it was transferred to UV curing machine, and were then UV irradiated from the top of base film. The light source was 365 nm LED (FireJet™ FJ100). Power=0.6 mW, Time=30 seconds. Finally, visual inspection by microscope was conducted to check whether the silicone hybrid pressure sensitive adhesive tape was well-laminated, without delamination and/or voids. Visual inspection results are shown in Tables 2-4, below. A value of 'A' means the sample had no delamination and no voids. A value of 'B' means the sample had partial delamination and/or a void. A value of 'C' means the sample completely delaminated.

In this Reference Example 12, the silicone hybrid pressure sensitive adhesive tapes prepared according to Reference Example 10, were evaluated for adhesion to an even surface. Each silicone hybrid pressure sensitive adhesive tape was placed on a stainless steel (SUS) plate and bonded thereto by moving a rubber-lined pressure roller of 2 kg weight on the strip twice back and forth. The assembly was held at RT temperature for 1 hour. The tape was then irradiated with UV from the top of the base film. The light source was 365 nm LED (FireJet™ FJ100). Power=0.6 mW, time=30 seconds. Finally, the adhesion force (g/inch) required to peel the tape off from the stainless steel plate by pulling at a speed of 300 mm/min and an angle of 180° was measured and recorded below in Tables 2-5. All recorded adhesion force in Table 2-5 were values when "Adhesive Failure" occurred. "Adhesion Failure" indicates the pressure sensitive adhesive on the base film was removed from the steel plate without adhesive residuals. "Fail to measure" means the pressure sensitive adhesive was torn or left on both fluoro-coated film (release linear) and base film when removing (stripping) from fluoro-coated film due to insufficient crosslinking, prepared in Reference Example 10. "Cohesive Failure" indicates that pressure sensitive adhesive was left on both base film and stainless steel plate (or adherend) after removing the tape.

In this Reference Example 13, the silicone hybrid pressure sensitive adhesive tapes prepared according to Reference Example 10, were evaluated for adhesion change to an even surface at three different condition; before/after UV radiation, and after UV radiation followed by thermal treatment. Each silicone hybrid pressure sensitive adhesive tape was placed on a stainless steel (SUS) plate and bonded thereto by moving a rubber-lined pressure roller of 2 kg weight on the strip twice back and forth. The assembly was held at RT temperature for 1 hour. Then, the adhesion force (g/inch) required to peel the tale off from the stainless steel plate by at a speed of 300 mm/min and an angle of 180° were measured at three different condition; 1) the adhesion force before UV radiation, 2) the adhesion force after UV radiation (The light source was 365 nm LED (FireJet™ FJ100). Power=0.6 mW, time=30 seconds), 3) the adhesion force after UV radiation, followed by exposed to 125° C. for 1 hours at a convection oven, and cooled to RT. All recorded adhesion force in Table 7 were values when "Adhesive Failure" occurred.

Tables 2-5 show the starting materials (described in detail above) and their amounts (in grams) used, as well as the test results after laminating onto uneven surfaces as described in Reference Example 9. The tables also show adhesion to an even, stainless steel (SUS) surface after UV irradiation cure as described in Reference Example 10.

TABLE 2

| | Comparative Examples 1-11 (Comp. 1-Comp. 11) | | | | | | | | | | |
|---|---|---|---|---|---|---|---|---|---|---|---|
| Product Name | Comp. 1 | Comp. 2 | Comp. 3 | Comp. 4 | Comp. 5 | Comp. 6 | Comp. 7 | Comp. 8 | Comp. 9 | Comp. 10 | Comp. 11 |
| A-1 | | | | | | 100 (133.33) | 100 (133.33) | 100 (133.33) | | | |
| A-2 | | | | | | | | | 100 (133.33) | 100 (133.33) | 100 (133.33) |
| A'-8 | 100 (100) | 100 (100) | 100 (100) | | | | | | | | |
| A'-9 | | | | 100 (333.33) | 100 (333.33) | | | | | | |
| B-1 | | | | | | 89.98 (131.54) | 100.11 (146.35) | | | | |
| B-2 | 75 (100) | 101.25 (135) | 101.25 (135) | 50 (66.66) | 75 (100) | | | 100 (133.33) | | | |
| B-3 | | | | | | | | | 59.74 (79.65) | 87.59 (116.78) | 88.46 (117.94) |
| C-1 | 1.0 | 1.0 | 0.07 | 1.7 | 1.7 | | | | 0.5 | 2.4 | 3.7 |
| C-2 | | | | | | 1.3 | 20.6 | 6.0 | | | |
| D-1 | 0.3 | 0.3 | 0.3 | 0.3 | 0.3 | 0.3 | 0.3 | 0.3 | | | |
| D-2 | | | | | | | | | 0.6 | 0.7 | 0.7 |
| E-1 | | | | | | 7.7 | 8.8 | 8.3 | 6.4 | 7.6 | 7.7 |
| F-1 | 0.2 | 0.2 | 0.2 | 0.2 | 0.2 | 0.2 | 0.2 | 0.2 | 0.2 | 0.2 | 0.2 |
| Total Solid | 176.45 | 202.70 | 201.77 | 152.12 | 177.12 | 199.38 | 230.04 | 214.73 | 167.51 | 198.58 | 200.80 |
| Total Solution | 201.45 | 236.45 | 235.52 | 402.12 | 435.45 | 274.28 | 309.62 | 281.40 | 220.76 | 261.11 | 263.62 |
| Calculations | C1 | C2 | C3 | C4 | C5 | C6 | C7 | C8 | C9 | C10 | C11 |
| % solids | 88% | 86% | 86% | 38% | 41% | 73% | 74% | 76% | 76% | 76% | 76% |
| % solvent | 12% | 14% | 14% | 62% | 59% | 27% | 26% | 24% | 24% | 24% | 24% |
| Resin/Polymer Ratio | 0.75 | 1.01 | 1.01 | 0.50 | 0.75 | 0.90 | 1.00 | 1.00 | 0.60 | 0.88 | 0.88 |
| SiH/Vi Ratio | 4.791 | 4.791 | 0.335 | 59.888 | 59.888 | 0.112 | 1.644 | 28.800 | 0.189 | 0.618 | 0.930 |
| SiH/Reactive Group Ratio | 4.791 | 4.791 | 0.335 | 59.888 | 59.888 | 0.039 | 0.602 | 0.423 | 0.105 | 0.400 | 0.603 |
| Lamination Condition on Uneven Surface | C1 | C2 | C3 | C4 | C5 | C6 | C7 | C8 | C9 | C10 | C11 |

TABLE 2-continued

Comparative Examples 1-11 (Comp. 1-Comp. 11)

| Product Name | Comp. 1 | Comp. 2 | Comp. 3 | Comp. 4 | Comp. 5 | Comp. 6 | Comp. 7 | Comp. 8 | Comp. 9 | Comp. 10 | Comp. 11 |
|---|---|---|---|---|---|---|---|---|---|---|---|
| RT for 30 min | C | C | A | C | C | — | C | C | — | C | C |
| 90° C. for 30 min | C | C | A | C | C | — | C | C | — | C | C |
| Adhesion to SUS after UV irradiation | 21.0 | 81.0 | Cohesive Failure | 19.5 | 27.3 | Fail to Measure | 7.7 | 69.2 | Fail to Measure | 38.0 | 27.0 |

TABLE 3

Comparative Examples 12 (Comp. 12) & Working Examples 1-8 (Inv. 1 to Inv. 8)

| Product Name | Comp. 12 | Inv. 1 | Inv. 2 | Inv. 3 | Inv. 4 | Inv. 5 | Inv. 6 | Inv. 7 | Inv. 8 | Inv. 9 |
|---|---|---|---|---|---|---|---|---|---|---|
| A-1 | | 100 (133.33) | 100 (133.33) | 100 (133.33) | 100 (133.33) | | | | | |
| A-2 | | | | | | 100 (133.33) | 100 (133.33) | 100 (133.33) | 100 (133.33) | 100 (133.33) |
| A-5 | 100 (133.33) | | | | | | | | | |
| B-1 | | 95.76 (140) | 95.76 (140) | | | | | | | |
| B-2 | | | | 98.4 (131.2) | 98.4 (131.2) | 243.75 (325) | | | | |
| B-3 | 59.7 (79.6) | | | | | | 86.74 (115.65) | 87.08 (116.1) | 59.99 (79.98) | 40.17 (53.56) |
| C-1 | | | | | | | 1.2 | 1.7 | 1.0 | 0.9 |
| C-2 | 1.2 | 10.8 | 7.1 | 4.5 | 2.6 | 2.0 | | | | |
| D-1 | | 0.3 | 0.3 | 0.3 | 0.3 | 0.3 | | | | |
| D-2 | 0.7 | | | | | | 0.7 | 0.7 | 0.6 | 0.5 |
| E-1 | 6.4 | 8.3 | 8.1 | 8.1 | 8.1 | 8.7 | 7.5 | 7.6 | 6.4 | 5.6 |
| F-1 | 0.2 | 0.2 | 0.2 | 0.2 | 0.2 | 0.2 | 0.2 | 0.2 | 0.2 | 0.2 |
| Total Solid | 168.27 | 215.35 | 211.46 | 211.51 | 209.53 | 354.85 | 196.41 | 197.28 | 168.31 | 147.47 |
| Total Solution | 221.51 | 292.93 | 289.04 | 277.64 | 275.66 | 469.43 | 258.66 | 259.64 | 221.64 | 194.19 |
| Calculations | C12 | Inv1 | Inv2 | Inv3 | Inv4 | Inv5 | Inv6 | Inv7 | Inv8 | Inv9 |
| % solids | 76% | 74% | 73% | 76% | 76% | 76% | 76% | 76% | 76% | 76% |
| % solvent | 24% | 26% | 27% | 24% | 24% | 24% | 24% | 24% | 24% | 24% |
| Resin/Polymer Ratio | 0.60 | 0.96 | 0.96 | 0.98 | 0.98 | 2.44 | 0.87 | 0.87 | 0.60 | 0.40 |
| SiH/Vi Ratio | 0.119 | 0.903 | 0.592 | 21.600 | 12.480 | 7.200 | 0.308 | 0.432 | 0.379 | 0.483 |
| SiH/Reactive Group Ratio | 0.112 | 0.325 | 0.213 | 0.317 | 0.183 | 0.243 | 0.199 | 0.279 | 0.212 | 0.223 |
| Lamination Condition on Uneven Surface | C12 | Inv1 | Inv2 | Inv3 | Inv4 | Inv5 | Inv6 | Inv7 | Inv8 | Inv9 |
| RT for 30 min | A | B | A | B | A | B | A | B | A | A |
| 90° C. for 30 min | A | A | A | A | A | A | A | A | A | A |
| Adhesion to SUS after UV irradiation | Cohesive Failure | 11.6 | 13.6 | 102.5 | 101.5 | 1950.0 | 77.0 | 41.0 | 18.2 | 6.7 |

TABLE 4

Working Examples 9-16 (Inv. 9 to Inv. 16)

| Product Name | Inv. 10 | Inv. 11 | Inv. 12 | Inv. 13 | Inv. 14 | Inv. 15 | Inv. 16 | Inv. 17 | Inv. 18 | Inv. 19 |
|---|---|---|---|---|---|---|---|---|---|---|
| A-2 | 100 (133.33) | 100 (133.33) | 100 (133.33) | 100 (133.33) | 100 (133.33) | 100 (133.33) | 100 (133.33) | 100 (133.33) | 100 (133.33) | 100 (133.33) |
| B-3 | 59.84 (79.79) | 40.08 (53.44) | 40.02 (53.36) | 272.3 (364.44) | 110.59 (147.45) | 54.21 (72.28) | 36.35 (48.47) | 53.77 (71.7) | 36.14 (48.19) | 53.6 (71.47) |
| C-1 | 0.7 | 0.6 | 0.4 | | | | | | | |
| C-2 | | | | 10.0 | 6.7 | 4.4 | 3.7 | 3.4 | 3.0 | 3.0 |
| D-2 | 0.6 | 0.5 | 0.5 | 1.4 | 1.4 | 1.0 | 0.9 | 0.6 | 0.5 | 1.0 |

TABLE 4-continued

Working Examples 9-16 (Inv. 9 to Inv. 16)

| Product Name | Inv. 10 | Inv. 11 | Inv. 12 | Inv. 13 | Inv. 14 | Inv. 15 | Inv. 16 | Inv. 17 | Inv. 18 | Inv. 19 |
|---|---|---|---|---|---|---|---|---|---|---|
| E-1 | 6.4 | 5.6 | 5.6 | 11.5 | 8.7 | 6.3 | 5.6 | 6.3 | 5.6 | 6.3 |
| F-1 | 0.2 | 0.2 | 0.2 | 0.2 | 0.2 | 0.2 | 0.2 | 0.2 | 0.2 | 0.2 |
| Total Solid | 167.83 | 147.10 | 146.85 | 396.45 | 227.58 | 166.21 | 146.77 | 164.28 | 145.45 | 164.07 |
| Total Solution | 221.11 | 193.79 | 193.53 | 520.89 | 297.78 | 217.61 | 192.22 | 215.54 | 190.83 | 215.27 |
| Calculations | Inv10 | Inv11 | Inv12 | Inv13 | Inv14 | Inv15 | Inv16 | Inv17 | Inv18 | Inv19 |
| % solids | 76% | 76% | 76% | 76% | 76% | 76% | 76% | 76% | 76% | 76% |
| % solvent | 24% | 24% | 24% | 24% | 24% | 24% | 24% | 24% | 24% | 24% |
| Resin/Polymer Ratio | 0.60 | 0.40 | 0.40 | 2.73 | 1.11 | 0.54 | 0.36 | 0.54 | 0.36 | 0.331 |
| SiH/Vi Ratio | 0.266 | 0.337 | 0.240 | 0.223 | 0.366 | 0.486 | 0.597 | 0.375 | 0.484 | 0.176 |
| SiH/Reactive Group Ratio | 0.148 | 0.155 | 0.110 | 0.190 | 0.255 | 0.259 | 0.262 | 0.200 | 0.211 | 0.250 |
| Lamination Condition on Uneven Surface | Inv10 | Inv11 | Inv12 | Inv13 | Inv14 | Inv15 | Inv16 | Inv17 | Inv18 | Inv19 |
| RT for 30 min | A | A | A | B | B | B | B | A | A | A |
| 90° C. for 30 min | A | A | A | A | A | A | A | A | A | A |
| Adhesion to SUS after UV irradiation | 13.3 | 4.4 | 3.3 | 340.2 | 99.5 | 8.3 | 3.6 | 8.3 | 3.1 | 8.5 |

TABLE 5

Working Examples 17-23 (Inv. 17 to Inv. 23)

| Product Name | Inv. 20 | Inv. 21 | Inv. 22 | Inv. 23 | Inv. 24 | Inv. 25 | Inv. 26 | Inv. 27 | Inv. 28 | Inv. 29 | Inv. 30 |
|---|---|---|---|---|---|---|---|---|---|---|---|
| A-2 | 100 (133.33) | | | | | 100 (133.33) | | | | | |
| A-3 | | 100 (133.33) | | 100 (133.33) | 100 (133.33) | | | | | | |
| A-4 | | | 100 (133.33) | | | | | | | | |
| A-6 | | | | | | | 100 (100) | 100 (100) | 100 (100) | 100 (100) | |
| A-7 | | | | | | | | | | | 100 (250) |
| B-3 | 36.04 (48.06) | 59.7 (79.6) | 59.7 (79.6) | 59.7 (79.6) | 59.7 (79.6) | 40.08 (53.44) | | | | | 16 (21.33) |
| B-4 | | | | | | | 312.5 (312.5) | 238.1 (238.1) | 190 (190) | 101.63 (101.63) | |
| C-1 | | | | | | 0.6 | | | | | |
| C-2 | 2.6 | 2.7 | 2.4 | 2.7 | 2.7 | | 2.8 | 2.0 | 2.3 | 2.3 | 2.0 |
| D-1 | | | | | | | 0.05 | 0.05 | 0.05 | 0.05 | 0.1 |
| D-2 | 0.9 | 0.7 | 0.7 | 0.7 | 3.1 | 0.7 | | | | | |
| E-1 | 5.5 | 6.5 | 6.5 | 6.5 | 6.5 | 5.6 | 6.2 | 5.1 | 4.4 | 3.1 | 2.4 |
| F-1 | 0.2 | 0.2 | 0.2 | 0.2 | 0.2 | 0.2 | 0.05 | 0.05 | 0.05 | 0.05 | 0.10 |
| I-1 | | | | 1.00 | | | | | | | |
| I-2 | | | | | 1.00 | | | | | | |
| J-1 | | | | | | 9.80 | | | | | |
| Total Solid | 145.32 | 169.83 | 169.52 | 170.83 | 170.83 | 156.90 | 421.83 | 345.54 | 297.02 | 207.33 | 120.66 |
| Total Solution | 190.66 | 223.07 | 222.75 | 223.07 | 223.07 | 203.59 | 421.83 | 345.54 | 297.02 | 207.33 | 159.33 |
| Calculations | Inv20 | Inv21 | Inv22 | Inv23 | Inv24 | Inv25 | Inv26 | Inv27 | Inv28 | Inv29 | Inv. 30 |
| % solids | 76% | 76% | 76% | 77% | 77% | 77% | 100% | 100% | 100% | 100% | 76% |
| % solvent | 24% | 24% | 24% | 23% | 23% | 23% | 0% | 0% | 0% | 0% | 24% |
| Resin/Polymer Ratio | 0.426 | 0.275 | 0.241 | 0.275 | 0.275 | 0.337 | 3.13 | 2.38 | 1.90 | 1.02 | 0.16 |
| SiH/Vi Ratio | 0.186 | 0.178 | 0.216 | 0.178 | 0.178 | 0.155 | 1.359 | 0.990 | 1.136 | 1.136 | 0.395 |
| SiH/Reactive Group Ratio | 0.322 | 0.208 | 0.182 | 0.208 | 0.208 | 0.337 | 0.050 | 0.046 | 0.062 | 0.094 | 0.155 |
| Lamination Condition on Uneven Surface | Inv20 | Inv21 | Inv22 | Inv23 | Inv24 | Inv25 | Inv26 | Inv27 | Inv28 | Inv29 | Inv30 |
| RT for 30 min | A | A | A | A | A | A | A | A | A | A | A |
| 90° C. for 30 min | A | A | A | A | A | A | A | A | A | A | A |
| Adhesion to SUS after UV irradiation | 4.4 | 12.4 | 15.8 | 7.8 | 6.7 | 4.8 | 1049.2 | 626.7 | 248.4 | 11.3 | 15.3 |

TABLE 6

Adhesion Force Change of Comparative Examples 2
and 4 and Working Examples 1, 9, 18, 20, and 21.

|  | Comp. 2 | Comp. 4 | Inv. 1 | Inv. 9 | Inv. 18 | Inv. 20 | Inv. 21 |
| --- | --- | --- | --- | --- | --- | --- | --- |
| Initial Adhesion (g/in), before UV irradiation | 80.8 | 19.4 | 54.0 | 64.9 | 22.2 | 88.0 | 28.4 |
| Subsequent Adhesion (g/in), after UV irradiation | 81.0 | 19.5 | 11.6 | 6.7 | 3.1 | 4.4 | 11.3 |
| Subsequent Adhesion (g/in), after UV irradiation and heat treatment (125° C., 1 hrs) | 201.0 | 319.5 | 13.0 | 20.9 | 12.2 | 27.3 | 26.3 |

Comparative Examples 1-5 show the effect of not using any (meth)acryloxyalkyl functional siloxanes in pressure sensitive adhesive compositions. Comparative examples 1, 2, 4, and 5 failed to adhere to the uneven surface or had voids. Comparative example 3 showed that the pressure sensitive adhesive failed to have sufficient crosslink density as shown by the cohesive failure on the stainless steel (even) surface although it was laminated without voids; cohesive failure indicated that pressure sensitive adhesive was torn and left behind on the surface after removing the tape.

Comparative Examples 6 and 9 showed that when SiH/Vi ratio were too low (<0.2), then the sample failed to measure adhesion force because inadequate crosslinking on base film caused pressure sensitive adhesive to be flowable or torn when removing fluoro-coated film, prepared in Reference Example 10. Comparative Examples 7, 8, 10, and 11 showed that when SiH/Reactive Group ratio were too high (>0.34), the sample failed to adhere to the uneven surface or had voids. Working Example 1 and 2 (which contained the same starting materials as Comparative Example 6 and 7), with different SiH/Vi ratio, SiH/Reactive Group ratio showed that when SiH/Vi ratio was 0.845 and 0.554, SiH/Reactive Group ratio was 0.331 and 0.217, a silicone hybrid pressure sensitive adhesive laminated without voids to an uneven surface could be prepared by lamination at 90° C. for 30 minutes and then irradiating with UV under the conditions described in Reference Example 11. After UV irradiation, further crosslinking reaction occurred, adhesion force could be measured without cohesive failure, which is a contrasting behavior with Comparative Example 3. Working Examples 1 and 2 showed re-workable property without remaining residuals on the surface after UV irradiation.

Comparative Example 8 showed that when SiH/Reactive Group ratio was 0.423 (>0.34), the sample failed to adhere to the uneven surface or had voids. In contrast, Working Example 3 and 4 with the same starting materials when SiH/Reactive Group ratio was 0.317 and 0.183, respectively, a silicone hybrid pressure sensitive adhesive laminated without voids to an uneven surface could be prepared by lamination at 90° C. for 30 minutes and then irradiating with UV under the conditions described in Reference Example 11. Working Example 4 when lower SiH/Reactive Group than Working Example 3, the sample was laminated without void at RT without heating for 30 minutes, and then irradiation with UV. After UV radiation, further crosslinking reaction occurred, adhesion force could be measured without cohesive failure.

Comparative Example 10 and 11 showed that when SiH/Reactive Group ratio was 0.401 and 0.604, respectively, the samples failed to adhere to the uneven surface or had voids. In contrast, Working Example 5 to 11 with the same starting materials when SiH/Reactive Group ratio was 0.110 to 0.279, a silicone hybrid pressure sensitive adhesive laminated without voids to an uneven surface could be prepared by lamination at 90° C. for 30 minutes and then irradiating with UV under the conditions described in Reference Example 11. Moreover, Working Example 14 to 20 with the different crosslinker (C-2) when SiH/Vi ratio was 0.331 and 0.597, SiH/Reactive Group Ratio was 0.176 and 0.262, a silicone hybrid pressure sensitive adhesive laminated without voids to an uneven surface could be prepared by lamination at 90° C. for 30 minutes and then irradiating with UV under the conditions described in Reference Example 9.

Working Examples 2, 4, 6, 8-12, and 17-20 showed that when SiH/Reactive Group was 0.111 to 0.223, the samples were successfully laminated on an uneven surface at RT without heating. Working Examples 1, 3, 5, 7, 14-16 had a slightly higher crosslinking density when SiH/Reactive Group 0.25 to 0.40 showed that applying heating during lamination, for example 90° C., helped to laminate on an uneven surface without voids.

Working Examples 19, 21, and 22 showed when SiH/Vi ratio was 0.241 to 0.331, SiH/Reactive Group ratio was 0.176 to 0.216, the sample laminated on an uneven surface without voids. However, Comparative Example 12 using the starting material (A-5) when (m+o)/n Ratio was 521/1 showed cohesive failure even after UV irradiation, which indicated sufficient further crosslinking did not occur by UV irradiation under the conditions tested. Meanwhile, Working Examples 19, 21, and 22 using the starting material (A-2 to A-5) having (m+o)/n Ratio=37/1 to 260/1 showed 'adhesion failure' without remaining residuals on the surface after UV irradiation.

Optional starting materials such as (I) the additive and (J) the filler, which did not influence crosslinking density when preparing silicone hybrid pressure sensitive adhesive layers, can be used for needs of industrial field, as shown in Working Example 23 to 25.

Without wishing to be bound by theory, it is thought that to laminate on an uneven surface, SiH/Vi ratio and SiH/Reactive Group representing a degree of crosslinking density control regardless of Resin/Polymer Ratio because Resin/Polymer Ratio itself does not influence crosslinking density. It is further thought that as the factor of Resin/Polymer Ratio is mainly related with adhesion property, adhesion force can be modified with maintaining lamination performance. For example, Working Examples Inv. 5, 13, and 26 when Resin/Polymer Ratio was 2.41 to 3.13 showed relatively higher adhesion and good lamination without voids, which demonstrates that the silicone hybrid pressure sensitive adhesive composition is also useful in the application field requiring high adhesion for long-term protection of surface of electronic device. For some samples, heating during lamination helped to laminate onto an uneven surface as shown by Inv.7 and Inv.13.

Table 6 demonstrated the other advantageous of silicone hybrid pressure sensitive adhesive for use in processing film. As conventional pressure sensitive adhesive according to Comp. 2 and Comp. 4 showed almost no change before and after UV irradiation. Especially, when exposed to high temperature such as 125° C., adhesion force highly increased, which meant that adhesion stability was poor and it would be difficult to detach from (opto)electric device after processing. As Working Example 9, 18, 20, 21 are shown in Table 6, adhesion force was reduced after UV irradiation and maintain low level of adhesion force even after exposed to high temperature.

INDUSTRIAL APPLICABILITY

The silicone hybrid pressure sensitive adhesive composition described herein can cure to form a silicone hybrid pressure sensitive adhesive. One purpose herein is to provide a reactive, deformable silicone hybrid pressure sensitive adhesive curable via hydrosilylation to a B-staged cure, e.g., that is non-flowable and deformable by pressure at room temperature or elevated temperature, and that can be formed into a desired shape, and that can be further cured by light irradiation, such as an ultraviolet (UV) ray (C-staged cure), while its shape is maintained. An additional purpose is to provide control of adhesion strength in accordance with each application field requiring easy to peel off or permanent bonding after UV irradiation. And, the silicone hybrid pressure sensitive adhesive may also be useful for protection of certain area of complex electronic parts during device processing by conforming on an uneven surface.

Usage of Terms

The BRIEF SUMMARY OF THE INVENTION and ABSTRACT are hereby incorporated by reference. All amounts, ratios, and percentages are by weight unless otherwise indicated by the context of the specification. The articles 'a', 'an', and 'the' each refer to one or more, unless otherwise indicated by the context of the specification. The disclosure of ranges includes the range itself and also anything subsumed therein, as well as endpoints. For example, disclosure of a range of >0.3 to 0.8 includes not only the range of >0.3 to 0.8, but also 0.4, 0.55, 0.6, 0.7, 0.78, and 0.8 individually, as well as any other number subsumed in the range. Furthermore, disclosure of a range of, for example, >0.3 to 0.8 includes the subsets of, for example, 0.4 to 0.6, 0.35 to 0.78, 0.41 to 0.75, 0.78 to 0.8, 0.32 to 0.41, 0.35 to 0.5 as well as any other subset subsumed in the range. Similarly, the disclosure of Markush groups includes the entire group and also any individual members and subgroups subsumed therein. For example, disclosure of the Markush group a vinyl, allyl or hexenyl includes the member vinyl individually; the subgroup vinyl and hexenyl; and any other individual member and subgroup subsumed therein.

Abbreviations used in this application are as defined below in Table 5.

TABLE 5

| Abbreviation | Definition |
| --- | --- |
| ° C. | degrees Celsius |
| Cm | Centimeter |
| DP | Degree of polymerization |

TABLE 5-continued

| Abbreviation | Definition |
| --- | --- |
| ETCH | Ethynyl cyclohexanol |
| FT-IR | Fourier Transform Infra-Red |
| G | Grams |
| GCMS | Gas chromatography mass spectrometry |
| GPC | Gel permeation chromatography |
| Hr or hr | Hour |
| J | Joules |
| KG or kg | Kilograms |
| Kgf | Kilograms force |
| Ma | methacryloxypropyl |
| Mbar | Millibar |
| Me | Methyl |
| (meth)acryl | a general term including both methacryl and acryl |
| Min | Minutes |
| Mm | Millimeters |
| Mn | Number average molecular weight measured by GPC |
| mPa · s | milliPascal seconds |
| Mw | Weight average molecular weight measured by GPC |
| mW | milliwatts |
| N | normal |
| Nm | Nanometers |
| OLED | Organic light emitting diode |
| Pa | Pascals |
| PD | Polydispersity |
| Ph | Phenyl |
| Pr | propyl |
| RPM | Revolutions per minute |
| RT | Room temperature of 25 ± 5° C. |
| μm or um | Micrometers |
| UV | ultra-violet |
| Vi | Vinyl |
| W | Watts |

Test Methods

[NMR Analysis]

An average molecular formula of starting materials (A) and (B), such as those mentioned in the Reference Example 1 to 6 was determined based on the following $^{29}$Si-NMR and $^{13}$C-NMR analysis: NMR apparatus: Fourier Transform Nuclear Magnetic Resonance Spectrometer JEOL (JEOL is a registered trademark of JEOL Ltd. Japan) JNM-EX400 (the product of JEOL Ltd.).

Determination method: Integrated values of the peaks were calculated based on signals derived from $^{29}$Si for various siloxane units shown below. An average molecular formula was identified by finding ratios of the integrated signal values obtained for various siloxane units (M, D, T, and Q units) and then finding siloxane-unit ratios based on the determined signal ratios. Due to overlap of chemical shift of Me2SiO$_{2/2}$ units and MaMeSiO$_{2/2}$ unit in $^{28}$Si-NMR, the ratio of Me$_2$SiO$_{2/2}$(D) and MaMeSiO$_{2/2}$(D') to obtain m/n ratio was determined by $^{13}$C-NMR. The contents of Reactive Group including unsaturated bonds and (meth)acryl groups was derived from an average molecular formula.

[SiH/Vi Ratio and SiH/Reactive Group Ratio]

SiH/Vi Ratio was calculated from the following equation.

$$SiH/Vi\ \text{Ratio} = \frac{SiH\ \text{Content}\left[\frac{mmol}{g}\right] \text{of}\ (C) \times \text{weight}\ [g]\ \text{of}\ (C)}{SiH\ \text{Content}\left[\frac{mmol}{g}\right] \text{of}\ (A) \times \text{weight}(g)\ \text{of}\ (A) + Vi\ \text{Content}\left[\frac{mmol}{g}\right] \text{of}\ (B) \times \text{weight}(g)\ \text{of}\ (B)}$$

-continued

SiH/Reactive Group Ratio =

$$\frac{\text{SiH Content}\left[\frac{mmol}{g}\right] \text{ of } (C) \times \text{weight}[g] \text{ of } (C)}{\text{Reactive Group Content}\left[\frac{mmol}{g}\right] \text{ of } (A) \times \text{weight}(g) \text{ of } (A) + \text{Reactive Group}\left[\frac{mmol}{g}\right] \text{ of } (B) \times \text{weight}(g) \text{ of } (B)}$$

[Gel Permeation Chromatography]

Molecular weight was measured by gel permeation chromatography according to the following method; Samples were prepared in toluene at 0.5% w/v concentration, filtered with a 0.45 μm PTFE syringe filter, and analyzed against polystyrene standards. The relative calibration (3rd order fit) used for molecular weight determination was based on 16 polystyrene standards ranging in molecular weights from 580 to 2,610,000 Daltons. The chromatographic equipment consisted of a Waters 2695 Separations Module equipped with a vacuum degasser, a Waters 2414 differential refractometer and two (7.8 mm×300 mm) styragel HR columns (molecular weight separation range of 100 to 4,000,000) preceded by a styragel guard column (4.6×30 mm). The separation was performed using toluene programmed to flow at 1.0 mL/min., injection volume was set at 100 μL and columns and detector were heated to 45° C. Data collection was 60 min and processing was performed using Empower software. As used herein for resins, Mw (Weight Average Molecular Weight) and Mn (Number Average Molecular Weight)

[Lamination Test on Uneven Surface]

Lamination performance on uneven surface were observed as described above in Example 11. [Adhesion Force]

Adhesive Force were measured as described above in Reference Example 12.

Embodiments of the Invention

In a first embodiment of the invention, a silicone hybrid pressure sensitive adhesive composition comprises:
100 parts by weight of (A) a linear, or substantially linear, polydiorganosiloxane having reactive groups comprising a silicon bonded (meth)acryloxyalkyl-functional group in a pendant position and optionally a silicon bonded aliphatically unsaturated hydrocarbon group in a terminal position, wherein starting material (A) comprises unit formula $M_pM''_qD_mD'_nD''_oT'''_rQ_s$, where
M represents a unit of formula $(R^1{}_3SiO_{1/2})$,
M'' represents a unit of formula $(R^1{}_2R^3SiO_{1/2})$,
D represents a unit of formula $(R^1{}_2SiO_{2/2})$,
D' represents a unit of formula $(R^1R^2SiO_{2/2})$,
D'' represents a unit of formula $(R^1R^3SiO_{2/2})$,
T''' represents a unit of formula $(R^5SiO_{3/2})$, and
Q represents a unit of formula $(SiO_{4/2})$, where
each $R^1$ is a monovalent hydrocarbon group free of aliphatic unsaturation,
each $R^2$ is the (meth)acryloxyalkyl functional group,
each $R^3$ is the aliphatically unsaturated monovalent hydrocarbon group,
each $R^5$ is independently selected from the group consisting of $R^1$, $R^2$, and $R^3$; and subscripts p, q, m, n, o, r, and s have values such that
0≤p, 0≤q, 0≤o, a quantity (p+q)≥2, a quantity (q+o) ≥2,
0<m<10,000, 2<n≤10,000, o≥0, a quantity (m+n+o) is 100 to 10,000, a ratio (m+o)/n is 1/1 to 500/1, a ratio (q+o)/(m+n) is 0≤to 1/5,
0≤r≤100, and
0≤s≤100,
a ratio (m+n+o)/(r+s) is 50/1 to 10,000/1 if 0<r or if 0<s;

(B) a polyorganosilicate resin in an amount sufficient to provide a weight ratio of the polyorganosilicate resin to (A) the polydiorganosiloxane (Resin/Polymer Ratio) of 0.15/1 to 4/1, where the polyorganosilicate resin comprises unit formula $M_aM''_bM'''_cD_dD'_eT'''_fQ_hX_i$, where M'', D, D', T''', and Q are as described above, M''' represents a unit of formula $(R^1{}_2R^2SiO_{1/2})$, where $R^1$ and $R^2$ are as described above, X represents a hydroxyl group, and subscripts a, b, c, d, e, f, h, and i, have values such that
a≥0, b≥0, c≥0 and a quantity (a+b+c)>10 mole %;
d≥0, e≥0, and a quantity (d+e) is 0 to a number sufficient to provide 30 mole % of D units and D' units combined to the resin;
f≥0, with the proviso that subscript f has a maximum value sufficient to provide 30 mole % of T''' units to the resin;
h>0, with the proviso that subscript h has a value sufficient to provide 30 mole % to 60 mole % of Q units to the resin;
a quantity (a+b+c+d+e+f+h)=100 mole %
i≥0 is not included in the molar ratio, with the proviso that subscript i has a maximum value sufficient to provide 5 mole % of hydroxyl groups to the resin;

(C) a polyorganohydrogensiloxane comprising unit formula $M_tM^H{}_uD_vD^H{}_wT_xT^H{}_yQ_z$, where M, D, and Q represent units of the formulas shown above, and
$M^H$ represents a unit of formula $(HR^1{}_2SiO_{1/2})$,
$D^H$ represents a unit of formula $(HR^1SiO_{2/2})$,
T represents a unit of formula $(R^1SiO_{3/2})$,
$T^H$ represents a unit of formula $(HSiO_{3/2})$, and
subscripts t, u, v, w, x, y, and z have values such that t≥0, u≥0, v≥0, w≥0, x≥0, y≥0, z≥0, a quantity (u+w+y)≥3, and a quantity (t+u+v+w+x+y+z) is sufficient to give the polyorganohydrogensiloxane a viscosity of 3 mPa·s to 1,000 mPa·s at 25° C.;
with the provisos that starting materials (A), (B), and (C), and amounts of each, are sufficient to provide:
i) a molar ratio of silicon bonded hydrogen atoms in starting material (C) to aliphatically unsaturated monovalent hydrocarbon groups $R^3$ in starting materials (A) and/or (B) (SiH/Vi ratio) of >0.2/1,
ii) a molar ratio of silicon bonded hydrogen atoms in starting material (C) to reactive groups in starting materials (A) and/or (B) (SiH/reactive group ratio) of <0.34, where the reactive groups are $R^2$ and $R^3$ combined;
(D) a hydrosilylation reaction catalyst in an amount sufficient to provide 2 ppm to 500 ppm of platinum based on combined weights of starting materials (A), (B), and (C);
0.1 weight % to 10 weight %, based on combined weights of starting materials (A), (B), and (C), of (E) a photoradical initiator;
10 ppm to 5,000 ppm, based on combined weights of starting materials (A), (B), and (C), of (F) a hydrosilylation reaction inhibitor;

5 ppm to 2,000 ppm, based on combined weights of starting materials (A) and (B), of (G) a free radical scavenger;

0 to 90 weight %, based on combined amounts of all starting materials in the composition, of (H) a solvent; and 0 to 5 weight % based on combined weights of starting materials (A) and (B), of (I) an additive selected from the group consisting of a sensitizer and a synergist.

0 to 30 weight % based on combined weights of starting materials (A) and (B), of (J) filler selected from the group consisting of a fumed silica or participated silica.

In a second embodiment, starting material (A) in the composition of the first embodiment comprises unit formula $M''2D_mD'_n$, a quantity (m+n) is 100 to 9,900, and a ratio m/n is 10/1 to 500/1.

In a third embodiment, starting material (A) in the composition of the second embodiment has the quantity (m+n)= 200 to 9,900.

In a fourth embodiment, starting material (A) in the composition of the third embodiment has the quantity (m+n)= 300 to 7,000.

In a fifth embodiment, starting material (A) in the composition of any one of the second to fourth embodiments has $R^2$ present in a mole % of 0.1% to 25% based on combined amounts of $R^1$, $R^2$, and $R^3$.

In a sixth embodiment, starting material (A) in the composition of the fifth embodiment has $R^2$ present in a mole % of 0.8% to 12%.

In a seventh embodiment, starting material (A) in the composition of the sixth embodiment has $R^2$ present in a mole % of 1.5% to 6%.

In an eighth embodiment, starting material (B) in the composition of the seventh embodiment comprises a unit formula selected from the group consisting of $M_aQ_h$, $M_aM''_bQ_h$, $M_aM''_bM'''_cQ_h$, $M_aM'''_cQ_h$, $M_aD_dQ_h$, $M_aD'_eQ_h$, $M_aM''_bD'_eQ_h$, $M_aM''_bT'''_fQ_h$, $M_aM''_bT'''_fQ_h$, where subscript a is 20 to 65 mole %, subscript b and c is 1 to 30 mole %, subscript d and e is 1 to 20 mole %, subscript f is 1 to 25 mole %, and subscript h is 35 to 55 mole %.

In a ninth embodiment, in starting materials (A) and (B) in any one of the first to eighth embodiments, each $R^5$ is independently selected from the group consisting of $R^1$, $R^2$ and $R^3$.

In a tenth embodiment, in starting materials (A) and (B) in the ninth embodiment, $R^5$ is $R^1$.

In an eleventh embodiment, starting material (C) in any one of the first to tenth embodiments comprises unit formula $M_tM^H_uD_vD^H_w$, where a quantity (t+u)=2, and a quantity (u+w)≥3.

In a twelfth embodiment, in the composition of any one of the first to eleventh embodiments, each monovalent hydrocarbon group for $R^1$ is selected independently from the group consisting of alkyl groups and aryl groups.

In a thirteenth embodiment, in the composition of the twelfth embodiment the alkyl group is methyl and the aryl group is phenyl.

In a fourteenth embodiment, in the composition of the twelfth embodiment or the thirteenth embodiment, each $R^1$ is the alkyl group.

In a fifteenth embodiment, in the composition of any one of the first to fourteenth embodiments, each (meth)acryloxyalkyl functional group for $R^2$ is independently selected from the group consisting of acryloxypropyl and methacryloxypropyl.

In a sixteenth embodiment, in the composition of any one of the first to fifteenth embodiments, each aliphatically unsaturated monovalent hydrocarbon group for $R^3$ is an independently selected alkenyl group.

In a seventeenth embodiment, in the composition of the sixteenth embodiment, the alkenyl group is selected from the group consisting of vinyl and hexenyl.

In an eighteenth embodiment, in the composition of any one of the first to seventeenth embodiments, Resin/Polymer Ratio is 0.2/1 to 3/1.

In a nineteenth embodiment, the composition of the eighteenth embodiment has Resin/Polymer Ratio=0.3/1 to 2.5/1.

In a twentieth embodiment, in the composition of any one of the first to nineteenth embodiments, SiH/Vi ratio is 0.21/1 to 22.0/1.

In a twenty-first embodiment, the composition of the nineteenth embodiment has SiH/Vi ratio of 0.23/1 to <12.5/1.

In a twenty-second embodiment, the composition of the twenty-first embodiment has SiH/Vi ratio of 0.23/1 to 0.9/1.

In a twenty-third embodiment, in the composition of any one of the first to twenty-second embodiments, the SiH/reactive group ratio is 0.03 to 0.30.

In a twenty-fourth embodiment, in the composition of the twenty-third embodiment the SiH/reactive group ratio is 0.04 to 0.28.

In a twenty-fifth embodiment, starting material (D) in the composition of any one of the first to twenty-fourth embodiments is selected from the group consisting of: i) a platinum group metal, ii) a compound of said metal, iii) a complex of said metal or said compound, v) the complex microencapsulated in a matrix or coreshell type structure.

In a twenty-sixth embodiment, starting material (D) in the composition of the twenty-fifth embodiment is present in an amount sufficient to provide 10 ppm to 100 ppm of the platinum group metal based on combined weights of starting materials (A), (B), and (C).

In a twenty-seventh embodiment, starting material (E) in the composition of any one of the first to twenty-sixth embodiments is selected from the group consisting of benzophenone, a substituted benzophenone compound, acetophenone, a substituted acetophenone compound, benzoin, an alkyl ester of benzoin, xanthone, and a substituted xanthone.

In a twenty-eighth embodiment, starting material (E) in the composition of the twenty-seventh embodiment is a substituted acetophenone.

In a twenty-ninth embodiment, starting material (E) in the composition of the twenty-eighth embodiment 1-hydroxycyclohexyl phenyl ketone.

In a thirtieth embodiment, in the composition of any one of the first to twenty-ninth embodiments, starting material (E) is present in an amount of 1 weight % to 5 weight %.

In a thirty-first embodiment, starting material (F) in the composition of any one of the first to thirtieth embodiments is present and is selected from the group consisting of acetylenic alcohols, cycloalkenylsiloxanes, ene-yne compounds, triazoles, phosphines, mercaptans, hydrazines, amines, fumarates, maleates, nitriles, ethers, carbon monoxide, alcohols, and silylated acetylenic alcohols.

In a thirty-second embodiment, in the composition of the thirty-first embodiment, the acetylenic alcohol is ethynyl cyclohexanol.

In a thirty-third embodiment, in the composition of any one of the first to thirty-second embodiments, starting material (F), the inhibitor is present in an amount of 20 ppm to 2,000 ppm.

In a thirty-fourth embodiment, starting material (G) the radical scavenger is present in the composition of any one of the first to thirty-third embodiments, and the radical scavenger is selected from the group consisting of acetylenic alcohols, cycloalkenylsiloxanes, ene-yne compounds, triazoles, phosphines, mercaptans, hydrazines, amines, fumarates, maleates, nitriles, ethers, carbon monoxide, alcohols, and silylated acetylenic alcohols.

In a thirty-fifth embodiment, in the composition of the thirty-fourth embodiment, the radical scavenger is selected from the group consisting of a phenolic compound, phenothiazine and an anaerobic inhibitor.

In a thirty-sixth embodiment, in the composition of the thirty-fifth embodiment, the radical scavenger is a phenolic compound.

In a thirty-seventh embodiment, in the composition of any one of the first to thirty-sixth embodiments, starting material (G), the radical scavenger is present in an amount of 10 ppm to 1,500 ppm.

In a thirty-eighth embodiment, in the composition of any one of the first to thirty-seventh embodiments, starting material (H), the solvent, is present and is selected from the group consisting of an aliphatic hydrocarbon and an aromatic hydrocarbon.

In a thirty-ninth embodiment, in the composition of any one of the first to thirty-eighth embodiments, starting material (H) the solvent is present in an amount of >0 to 60 weight %.

In a fortieth embodiment, in the composition of any one of the first to fortieth embodiments, (I) the additive is present in an amount of 0.05 weight % to 3 weight %.

In a forty-first embodiment, in the composition of any one of the first to fortieth embodiments, starting material (J) the filler is present in an amount of 1 weight % to 30 weight %, based on combined weights of starting materials (A) and (B).

In a forty-second embodiment, in the composition of any one of the first to forty-first embodiments, starting material (K) a bis-SiH-terminated polydiorganosiloxane is present in a weight ratio of starting material (K) to starting material (C) [(K)/(C) ratio] of 0.25/1 to 4/1.

In a forty-third embodiment, in the composition of any one of the first to forty-second embodiments, the filler is present and is selected from the group consisting of fumed silica, precipitated silica, and both fumed silica and precipitated silica.

In a forty-fourth embodiment, a method for preparing an adhesive article comprising a pressure sensitive adhesive layer on a surface of a substrate comprises the steps of:
optionally 1) treating the surface of the substrate;
2) coating the silicone hybrid pressure sensitive adhesive composition of any one of the preceding embodiments on the surface,
optionally 3) removing all or a portion of the solvent, if present,
4) heating the silicone hybrid pressure sensitive adhesive composition to form a silicone hybrid pressure sensitive adhesive layer on the surface of the substrate.

In a forty-fifth embodiment, a method for adhering an adhesive article to an uneven surface comprises:
optionally 1) treating the surface of the substrate;
2) coating the silicone hybrid pressure sensitive adhesive composition of any one of the preceding embodiments on the surface,
optionally 3) removing all or a portion of the solvent, if present,
4) heating the silicone hybrid pressure sensitive adhesive composition to form a silicone hybrid pressure sensitive adhesive layer on the surface of the substrate,
5) applying the adhesive article to an uneven surface such that the silicone hybrid pressure sensitive adhesive layer contacts the uneven surface opposite the substrate,
optionally 6) applying heat and/or pressure to the adhesive article and the uneven surface, and
7) exposing the silicone hybrid pressure sensitive adhesive layer to UV radiation; thereby conforming the silicone hybrid pressure sensitive adhesive layer to the uneven surface.

In a forty-sixth embodiment, the method of the forty-fifth embodiment further comprises, before step 1), forming the silicone hybrid pressure sensitive adhesive composition by mixing the starting materials.

In a forty-seventh embodiment, in the method of the forty-fifth or the forty-sixth embodiment, the uneven surface is all or a portion of a ball grid array.

The invention claimed is:

1. A silicone hybrid pressure sensitive adhesive composition comprises:
100 parts by weight of (A) a linear, or substantially linear, polydiorganosiloxane having reactive groups comprising a silicon bonded (meth)acryloxyalkyl-functional group in a pendant position and optionally a silicon bonded aliphatically unsaturated hydrocarbon group in a terminal position, wherein starting material (A) comprises unit formula $M_p M''_q D_m D'_n D''_o T'''_r Q_s$, where M represents a unit of formula $(R^1_3 SiO_{1/2})$,
M" represents a unit of formula $(R^1_2 R^3 SiO_{1/2})$,
D represents a unit of formula $(R^1_2 SiO_{2/2})$,
D' represents a unit of formula $(R^1 R^2 SiO_{2/2})$,
D" represents a unit of formula $(R^1 R^3 SiO_{2/2})$,
T''' represents a unit of formula $(R^5 SiO_{3/2})$, and
Q represents a unit of formula $(SiO_{4/2})$, where
each $R^1$ is a monovalent hydrocarbon group free of aliphatic unsaturation,
each $R^2$ is the (meth)acryloxyalkyl functional group,
each $R^3$ is the aliphatically unsaturated monovalent hydrocarbon group,
each $R^5$ is independently selected from the group consisting of $R^1$, $R^2$, and $R^3$, and
subscripts p, q, m, n, o, r, and s have values such that
$0 \leq p$, $0 \leq q$, $0 \leq o$, a quantity $(p+q) \geq 2$, a quantity $(q+o) \geq 2$
$0 < m < 10,000$, $2 < n \leq 10,000$, $o \geq 0$, a quantity $(m+n+0)$ is 100 to 10,000,
a ratio $(m+o)/n$ is 1/1 to 500/1,
a ratio $(q+o)/(m+n)$ is $0 \leq$ to 1/5,
$0 \leq r \leq 100$, and
$0 \leq s \leq 100$,
a ratio $(m+n+o)/(r+s)$ is 50/1 to 10,000/1 if $0 < r$ or if $0 < s$;
(B) a polyorganosilicate resin in an amount sufficient to provide a weight ratio of the polyorganosilicate resin to (A) the polydiorganosiloxane (Resin/Polymer Ratio) of 0.15/1 to 4/1, where the polyorganosilicate resin comprises unit formula $M_a M''_b M'''_c D_d D'_e T'''_f Q_h X_i$, where M", D, D', T, and Q are as described above, M''' represents a unit of formula $(R^1_2 R^2 SiO_{1/2})$, where $R^1$ and $R^2$ are as described above, X represents a hydroxyl group, and subscripts a, b, c, d, e, f, h, and i, have values such that
$a \geq 0$, $b \geq 0$, $c \geq 0$ and a quantity $(a+b+c) > 10$ mole %;

d≥0, e≥0, and a quantity (d+e) is 0 to a number sufficient to provide 30 mole % of D units and D' units combined to the resin;

f≥0, with the proviso that subscript f has a maximum value sufficient to provide 40 mole % of T''' units to the resin;

h>0, with the proviso that subscript h has a value sufficient to provide 30 mole % to 70 mole % of Q units to the resin;

a+b+c+d+e+f+h=100 mole %;

i≥0 is not included in the molar ratio, with the proviso that subscript i has a maximum value sufficient to provide 5 mole % of hydroxyl groups to the resin (C) a polyorganohydrogensiloxane comprising unit formula $M_tM^H_uD_vD^H_wT_xT^H_yQ_z$, where M, D, T, and Q represent units of the formulas shown above, and $M^H$ represents a unit of formula $(HR^1_2SiO_{1/2})$, $D^H$ represents a unit of formula $(HR^1SiO_{2/2})$, T represents a unit of formula $(R^1SiO_{3/2})$, $T^H$ represents a unit of formula $(HSiO_{3/2})$, and subscripts t, u, v, w, x, y, and z have values such that t≥0, u≥0, v≥0, w≥0, x≥0, y≥0, z≥ 0, a quantity (u+w+y)≥2, and a quantity (t+u+V+W+x+y+z) is sufficient to give the polyorganohydrogensiloxane a viscosity of 3 mPa·s to 1,000 mPa·s at 25° C.;

with the provisos that starting materials (A), (B), and (C), and amounts of each, are sufficient to provide:

i) a molar ratio of silicon bonded hydrogen atoms in starting material (C) to aliphatically unsaturated monovalent hydrocarbon groups $R^3$ in starting materials (A) and/or (B) (SiH/Vi ratio) of >0.2/1, ii) a molar ratio of silicon bonded hydrogen atoms in starting material (C) to reactive groups in starting materials (A) and/or (B) (SiH/reactive group ratio) of <0.34, where the reactive groups are $R^2$ and $R^3$ combined;

(D) a hydrosilylation reaction catalyst in an amount sufficient to provide 2 ppm to 500 ppm of platinum based on combined weights of starting materials (A), (B), and (C); 0.1 weight % to 10 weight %, based on combined weights of starting materials (A), (B), and (C), of (E) a photoradical initiator;

10 ppm to 5,000 ppm, based on combined weights of starting materials (A), (B), and (C), of (F) a hydrosilylation reaction inhibitor;

5 ppm to 2,000 ppm, based on combined weights of starting materials (A) and (B), of (G) a free radical scavenger;

0 to 90 weight %, based on combined amounts of all starting materials in the composition, of (H) a solvent;

0 to 5 weight % based on combined weights of starting materials (A) and (B), of (I) an additive selected from the group consisting of a sensitizer and a synergist; and 0 to 30 weight % based on combined weights of starting materials (A) and (B), of (J) filler selected from the group consisting of a fumed silica or participated silica.

2. The composition of claim 1, where (A) the polydiorganosiloxane comprises unit formula $M''_2D_mD'_n$, a quantity (m+n) is 100 to 9,900, and a ratio m/n is 10/1 to 500/1.

3. The composition of claim 1, where (B) the polyorganosilicate resin comprises a unit formula selected from the group consisting of $M_aQ_h$, $M_aM''_bQ_h$, $M_aM''_bM'''_cQ_h$, $M_aM''_cQ_h$, $M_aD_dO_h$, $M_aD'_eO_h$, $M_aM''_bD'_eQ_h$, $M_aM''_b$-$T'''_fQ_h$, $M_aM''_bT'''_fQ_h$, where subscript a, b and c is 20 to 70 mole %, subscript d and e is 1 to 20 mole %, subscript f is 1 to 25 mole %, and subscript h is 35 to 65 mole %.

4. The composition of claim 1, where (C) the polyorganohydrogensiloxane crosslinker comprises unit formula $M_tM^H_uD_vD^H_w$, where a quantity (t+u)=2, and a quantity (u+w)≥3.

5. The composition of claim 1, where the weight ratio of (B) the polyorganosilicate resin to (A) the polydiorganosiloxane (Resin/Polymer Ratio) is 0.2/1 to 3/1.

6. The composition of claim 1, where (D) the hydrosilylation reaction catalyst is selected from the group consisting of: i) a platinum group metal, ii) a compound of said metal, iii) a complex of said metal or said compound, v) the complex microencapsulated in a matrix or coreshell type structure.

7. The composition of claim 1, where (E) the photoradical initiator is selected from the group consisting of benzophenone, a substituted benzophenone compound, acetophenone, a substituted acetophenone compound, benzoin, an alkyl ester of benzoin, xanthone, and a substituted xanthone.

8. The composition of claim 1, where (F) the hydrosilylation reaction inhibitor is present and is selected from the group consisting of acetylenic alcohols, cycloalkenylsiloxanes, ene-yne compounds, triazoles, phosphines, mercaptans, hydrazines, amines, fumarates, maleates, nitriles, ethers, carbon monoxide, alcohols, and silylated acetylenic alcohols.

9. The composition of claim 1, where the free radical scavenger is present and is selected from the group consisting of a phenolic compound, phenothiazine and an anaerobic inhibitor.

10. The composition of claim 1, where (H) the solvent is present and is selected from the group consisting of an aliphatic hydrocarbon and an aromatic hydrocarbon.

11. A method for preparing an adhesive article comprising a pressure sensitive adhesive layer on a surface of a substrate, the method comprising:

optionally 1) treating the surface of the substrate;

2) Coating the silicone hybrid pressure sensitive adhesive composition of claim 1 on the surface, optionally 3) removing all or a portion of (H) the solvent, if present, 4) Heating the silicone hybrid pressure sensitive adhesive composition to form a silicone hybrid pressure sensitive adhesive layer on the surface of the substrate.

12. The method of claim 11, further comprising;

5) Applying the adhesive article to an uneven surface such that the silicone hybrid pressure sensitive adhesive layer contacts the uneven surface opposite the substrate, optionally 6) applying heat and/or pressure to the adhesive article and the uneven surface, and 7) Exposing the silicone hybrid pressure sensitive adhesive layer to UV radiation;

thereby conforming the silicone hybrid pressure sensitive adhesive layer to the uneven surface.

13. The method of claim 11, where the uneven surface is all or a portion of a ball grid array.

14. The composition of claim 1, where in (B) the polyorganosilicate resin, the maximum value of subscript f is sufficient to provide 30 mole % of T''' units to the resin and the value of subscript h is sufficient to provide 30 mole % to 60 mole % of Q units to the resin.

15. The composition of claim 1, where (B) the polyorganosilicate resin comprises a unit formula selected from the group consisting of $M_aQ_h$, $M_aM''_bQ_h$, $M_aM''_bM'''_cQ_h$, $M_aM''_cQ_h$, $M_aD_aQ_h$, $M_aD'_eQ_h$, $M_aM''_bD'_eQ_h$, $M_aM''_bT'''_fQ_h$, $M_aM''_bT'''_fQ_h$, where subscript a is 20 to 65 mole %, subscript b and c is 1 to 30 mole %, subscript d and e is 1 to 20 mole %, subscript f is 1 to 25 mole %, and subscript h is 35 to 55 mole %.

\* \* \* \* \*